US012812728B2

(12) United States Patent
Pradas et al.

(10) Patent No.: US 12,812,728 B2
(45) Date of Patent: Nov. 24, 2026

(54) MULTIPLE DRX CONFIGURATIONS WITH TRAFFIC FLOW INFORMATION

(71) Applicant: Telefonaktiebolaget LM Ericsson (publ), Stockholm (SE)

(72) Inventors: Jose Luis Pradas, Stockholm (SE); Du Ho Kang, Sollentuna (SE); Andra Mihaela Voicu, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 179 days.

(21) Appl. No.: 18/703,503

(22) PCT Filed: Oct. 21, 2022

(86) PCT No.: PCT/SE2022/050962
§ 371 (c)(1),
(2) Date: Apr. 22, 2024

(87) PCT Pub. No.: WO2023/069005
PCT Pub. Date: Apr. 27, 2023

(65) Prior Publication Data

US 2024/0430979 A1 Dec. 26, 2024

Related U.S. Application Data

(60) Provisional application No. 63/270,622, filed on Oct. 22, 2021.

(51) Int. Cl.
*H04W 76/28* (2018.01)
*H04W 72/23* (2023.01)

(52) U.S. Cl.
CPC .......... *H04W 76/28* (2018.02); *H04W 72/23* (2023.01)

(58) Field of Classification Search
CPC . H04W 76/02; H04W 72/23; H04W 52/0216; H04W 72/1273; H04W 72/21; H04W 72/232; H04W 76/11; Y02D 30/70
(Continued)

(56) References Cited

U.S. PATENT DOCUMENTS

| | | | |
|---|---|---|---|
| 2020/0015312 A1 | 1/2020 | He et al. | |
| 2020/0037396 A1 | 1/2020 | Islam et al. | |

(Continued)

FOREIGN PATENT DOCUMENTS

| | | |
|---|---|---|
| WO | 2021067444 A2 | 4/2021 |
| WO | 2023031877 A1 | 3/2023 |

OTHER PUBLICATIONS

Author Unknown, "Technical Specification Group Radio Access Network; NR; Multiplexing and channel coding (Release 16)," Technical Specification 38.212, Version 16.7.0, Sep. 2021, 3GPP Organizational Partners, 153 pages.

(Continued)

*Primary Examiner* — Rownak Islam
(74) *Attorney, Agent, or Firm* — Withrow & Terranova, PLLC

(57) ABSTRACT

Systems and methods for signaling of traffic flow information for Discontinuous Reception (DRX) configuration are provided. A method of operating a UE for determining a flow type includes: receiving a configuration of flow identify information with an association between one or more of: Downlink Control Information (DCIs); Radio Network Temporary Identifier (RNTIs); a combination of fields; with one or more DRX configurations; monitoring a Physical Downlink Control Channel (PDCCH) in DRX Active Time; in response to receiving a PDCCH with DCI indication of a flow type, identifying the DRX configuration k associated to the DCI indication; and starting or restarting a correspond- (Continued)

ing timer in the next symbol after PDCCH reception. In this way, signaling for a flow type, DRX configuration, or DRX parameter value indication from a gNB to a UE can be provided, in order to optimize multiple DRX cycle configurations per Serving Cell, where one or more of the configurations are active simultaneously.

19 Claims, 8 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2022/0304003 | A1* | 9/2022 | Sun | H04L 1/1893 |
| 2022/0312546 | A1* | 9/2022 | Fu | H04L 1/1883 |
| 2022/0417979 | A1* | 12/2022 | Papasakellariou | H04W 4/06 |
| 2023/0189291 | A1* | 6/2023 | Jiang | H04W 52/0229 370/329 |
| 2023/0199654 | A1* | 6/2023 | Lee | H04W 52/0229 455/574 |
| 2023/0337319 | A1* | 10/2023 | Luo | H04W 52/0216 |

OTHER PUBLICATIONS

Author Unknown, "Technical Specification Group Radio Access Network; NR; Physical layer procedures for control (Release 16)," Technical Specification 38.213, Version 16.7.0, Sep. 2021, 3GPP Organizational Partners, 188 pages.

Author Unknown, "Technical Specification Group Radio Access Network; NR; Medium Access Control (MAC) protocol specification (Release 16)," Technical Specification 38.321, Version 6.5.0, Jun. 2021, 3GPP Organizational Partners, 157 pages.

Author Unknown, "Technical Specification Group Radio Access Network; NR; Radio Resource Control (RRC) protocol specification (Release 16)," Technical Specification 38.331, Version 16.5.0, Jun. 2021, 3GPP Organizational Partners, 959 pages.

VIVO, "R1-2103827: [104b-e-NR-XR-02] Email discussion for evaluation methodology and assumptions," 3GPP TSG-RAN WG1 Meeting #104b-e, Apr. 12-20, 2021, Electronic Meeting, 31 pages.

VIVO, "R1-2106038: Summary of AI 8.14.4 for XR," 3GPP TSG-RAN WG1 Meeting #105-e, May 10-27, 2021, Electronic Meeting, 9 pages.

Qualcomm Incorporated, et al., S4aV200640: [FS_XRTraffic] Summary of XR Traffic Models for RAN1 and Open Issues, 3GPP SA4-e (AH) Video SWG post 111-e, Nov. 24, 2020, 17 pages.

ZTE, "R2-2105912: [AT113bis-e][708][V2X/SL] DRX configuration for SL groupcast and broadcast," 3GPP TSG-RAN WG2 Meeting #114, May 19-27, 2021, Electronic Meeting, 21 pages.

International Search Report and Written Opinion for International Patent Application No. PCT/IB2022/058282, mailed Dec. 22, 2022, 10 pages.

International Search Report and Written Opinion for International Patent Application No. PCT/SE2022/050962, mailed Jan. 27, 2023, 7 pages.

Author Unknown, "Technical Specification Group Radio Access Network; NR; Medium Access Control (MAC) protocol specification (Release 16)," Technical Specification 38.321, Version 16.5.0, Jun. 2021, 3GPP Organizational Partners, 157 pages.

Request for the Submission of an Opinion for Korean Patent Application No. 10-2024-7016510, mailed Jul. 9, 2026, 13 pages.

* cited by examiner

MULTIPLE DRX CONFIGURATIONS WITH TRAFFIC FLOW INFORMATION

RELATED APPLICATIONS

This application is a 35 U.S.C. § 371 national phase filing of International Application No. PCT/SE2022/050962, filed Oct. 21, 2022, which claims the benefit of provisional patent application Ser. No. 63/270,622, filed Oct. 22, 2021, the disclosures of which are incorporated herein by reference in their entireties.

TECHNICAL FIELD

The present disclosure relates generally to Discontinuous Reception (DRX) configurations.

BACKGROUND

The present disclosure relates to the concepts of Discontinuous Reception (DRX), Extended Reality (XR) applications (in general, any type of service) whose traffic comprises multiple traffic flows, as well as Layer 1 signaling for traffic scheduling. A summary of DRX operation is provided and then a description of the specifics of XR traffic relevant to the present disclosure is provided. Additionally, background information regarding signaling at Layer 1 to schedule data traffic is presented with a focus on Physical Downlink Control Channel (PDCCH) and Downlink Control Information (DCI).

DRX

DRX is a mechanism which enables the User Equipment (UE) to save energy by not monitoring the Downlink (DL) during certain periods of time, when data traffic is not expected at the UE. The DRX framework consists of two different types of DRX cycles with different periods: a long DRX cycle and an optional short DRX cycle. In principle, the short DRX cycle results in the UE monitoring the DL more often than when the UE operates according to the long DRX cycle. Entering the long or short DRX cycles occurs as follows. If the short DRX cycle is not configured, the UE enters the long DRX cycle after the inactivity timer expires, i.e., when there are no DL or Uplink (UL) transmissions for a period of time. If the optional short DRX cycle is configured, the UE enters this cycle after the DRX inactivity timer expires. If the short DRX cycle is configured and the short cycle timer expires, the UE enters the long DRX cycle.

DRX is controlled by the following main parameters (additional details can be found in 3GPP, TS 38.321, V16.5.0 (2021 June), Section 5.7 Discontinuous Reception (DRX), referred to hereinafter as [1]):

- drx-onDurationTimer: the duration at the beginning of a DRX cycle;
- drx-SlotOffset: the delay before starting the drx-onDurationTimer;
- drx-InactivityTimer: the duration after the Physical Downlink Control Channel (PDCCH) occasion in which a PDCCH indicates a new UL or DL transmission for the Medium Access Control (MAC) entity;
- drx-RetransmissionTimerDL (per DL Hybrid Automatic Repeat Request (HARQ) process except for the broadcast process): the maximum duration until a DL retransmission is received;
- drx-RetransmissionTimerUL (per UL HARQ process): the maximum duration until a grant for UL retransmission is received;

- drx-LongCycleStartOffset: the Long DRX cycle and drx-StartOffset which defines the subframe where the Long and Short DRX cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity;
- ps-Wakeup (optional): the configuration to start associated drx-onDurationTimer in case DCI with Cyclic Redundancy Check (CRC) scrambled by Power Saving-Radio Network Temporary Identifier (PS-RNTI) (DCP) is monitored but not detected;
- ps-TransmitOtherPeriodicCSI (optional): the configuration to report periodic CSI that is not L1-RSRP on Physical Uplink Control Channel (PUCCH) during the time duration indicated by drx-onDurationTimer in case DCP is configured but associated drx-onDurationTimer is not started;
- ps-TransmitPeriodicLI-RSRP (optional): the configuration to transmit periodic CSI that is L1-RSRP on PUCCH during the time duration indicated by drx-onDurationTimer in case DCP is configured but associated drx-onDurationTimer is not started.

The DRX configuration may take the following values (additional details can be found in 3GPP, TS 38.331, V16.5.0 (2021 June), Section 6.3.2 Radio resource control information elements, referred to hereinafter as [2]).

DRX-Config Information Element

```
--ASN1START
--TAG-DRX-CONFIG-START
DRX-Config:: =SEQUENCE {
drx-onDurationTimer CHOICE {
subMilliSeconds INTEGER (1 . . . 31),
milliSeconds ENUMERATED {
ms1, ms2, ms3, ms4, ms5, ms6, ms8, ms10, ms20, ms30, ms40, ms50, ms60,
ms80, ms100, ms200, ms300, ms400, ms500, ms600, ms800, ms1000, ms1200,
ms1600, spare8, spare7, spare6, spare5, spare4, spare3, spare2, spare1}
},
drx-InactivityTimer ENUMERATED {
ms0, ms1, ms2, ms3, ms4, ms5, ms6, ms8, ms10, ms20, ms30, ms40,
ms50, ms60, ms80,
ms100, ms200, ms300, ms500, ms750, ms1280, ms1920, ms2560,
spare9, spare8,
spare7, spare6, spare5, spare4, spare3, spare2, spare1},
drx-HARQ-RTT-TimerDL INTEGER (0 . . . 56),
drx-HARQ-RTT-TimerUL INTEGER (0 . . . 56),
drx-RetransmissionTimerDL ENUMERATED {
sl0, sl1, sl2, sl4, sl6, sl8, sl16, sl24, sl33, sl40, sl64, sl80, sl96, sl112, sl128,
sl160, sl320, spare15, spare14, spare13, spare12, spare11, spare10, spare9,
spare8, spare7, spare6, spare5, spare4, spare3, spare2, spare1},
drx-RetransmissionTimerUL ENUMERATED {
sl0, sl1, sl2, sl4, sl6, sl8, sl16, sl24, sl33, sl40, sl64, sl80, sl96, sl112, sl128,
```

```
s1160, s1320, spare15, spare14, spare13, spare12,
  spare11, spare10, spare9,
spare8, spare7, spare6, spare5, spare4, spare3, spare2,
  spare1},
drx-LongCycleStartOffset CHOICE {
ms10 INTEGER (0 . . . 9),
ms20 INTEGER (0 . . . 19),
ms32 INTEGER (0 . . . 31),
ms40 INTEGER (0 . . . 39),
ms60 INTEGER (0 . . . 59),
ms64 INTEGER (0 . . . 63),
ms70 INTEGER (0 . . . 69),
ms80 INTEGER (0 . . . 79),
ms128 INTEGER (0 . . . 127),
ms160 INTEGER (0 . . . 159),
ms256 INTEGER (0 . . . 255),
ms320 INTEGER (0 . . . 319),
ms512 INTEGER (0 . . . 511),
ms640 INTEGER (0 . . . 639),
ms1024 INTEGER (0 . . . 1023),
ms1280 INTEGER (0 . . . 1279),
ms2048 INTEGER (0 . . . 2047),
ms2560 INTEGER (0 . . . 2559),
ms5120 INTEGER (0 . . . 5119),
ms10240 INTEGER (0 . . . 10239)
},
short DRX SEQUENCE {
drx-ShortCycle ENUMERATED {
ms2, ms3, ms4, ms5, ms6, ms7, ms8, ms10, ms14, ms16,
  ms20, ms30, ms32,
ms35, ms40, ms64, ms80, ms128, ms160, ms256, ms320,
  ms512, ms640, spare9,
spare8, spare7, spare6, spare5, spare4, spare3, spare2,
  spare1},
}
drx-ShortCycleTimer INTEGER (1 . . . 16)
OPTIONAL, --Need R
drx-SlotOffset INTEGER (0 . . . 31)
}
--TAG-DRX-CONFIG-STOP
--ASN1STOP
```

A UE can be configured with up to two DRX parameter sets, each corresponding to a DRX group. A Serving Cell can be assigned to only one DRX group [1]. This means that the UE monitors the DL of a given Serving Cell according to only one long DRX cycle configuration and, optionally, one short DRX cycle configuration.

If the UE uses the long DRX cycle, it monitors the DL by starting the drx-onDurationTimer, if the following condition is fulfilled:

$$[(SFN\times 10)+\text{subframe number}]\text{modulo}(drx\text{-LongCycle})=drx\text{-StartOffset},$$

where SFN is the system frame number.

If the UE uses the short DRX cycle, it monitors the DL by starting the drx-onDurationTimer, if the following condition is fulfilled:

$$[(SFN\times 10)+\text{subframe number}]\text{modulo}(drx\text{-ShortCycle})=(drx\text{-StartOffset})\text{modulo (drxShortCycle)}.$$

The UE DL monitoring operation according to the long and the short DRX cycles is illustrated in FIG. 1. FIG. 1 illustrates a basic UE DL monitoring when the long and short DRX cycles are configured. The time during which the drx-onDuration Timer or drx-Inactivity Timer is running is part of the Active Time when the UE monitors the DL.

XR Traffic

XR applications typically generate multiple traffic flows and this is modelled accordingly in 3GPP (additional details can be found in 3GPP, S4aV200640, "[FS_XRTraffic] Summary of XR Traffic Models for RANI and Open Issues", 12 Jan. 2021, referred to hereinafter as [3]). For instance, these flows can correspond to video, audio, and data (control) traffic, respectively. All these flows are assumed to be periodic, but the inter-frame time (i.e., the periodicity) and data rate for each of the flows is different from the other flows. As an example, for DL XR conversational traffic, the inter-frame time of the video, audio, and data flows is 16.67 ms (i.e., 1/60 fps), 20-21.3 ms, and 10 ms, respectively [3]. Another characteristic of XR traffic is that the packet sizes are typically varying, especially for video flows.

PDCCH for Data Traffic Scheduling at Layer 1

In 3GPP NR standard, DCI is received over the PDCCH. The PDCCH may carry DCI in messages with different formats (additional details can be found in 3GPP, TS 38.212, V16.7.0 (2021 September), Section 7 Downlink transport channels and control information, referred to hereinafter as [5]). DCI formats 0_0, 0_1, and 0_2 are DCI messages used to convey uplink grants to the UE for transmission of the PUSCH. DCI formats 1_0, 1_1, and 1_2 are used to convey downlink grants for transmission of the PDSCH.

In NR, a frame has a duration of 10 ms and consists of 10 subframes. Each subframe consists of $2^{\mu}$ slots of 14 OFDM symbols each, where $\mu=0, 1, 2, 3$ for the subcarrier spacing of $15\times 2^{\mu}$ kHz, respectively. Although a slot is a typical unit for radio resource allocation, NR enables transmission to start at any OFDM symbol and last only as many symbols as needed for the communication.

A DCI usually only includes information for time-frequency resource allocation, HARQ process, modulation and coding, and retransmission related information, which at the end are essential for reception of physical layer data signals. If a new transmission is indicated via PDCCH with the DCI formats above, the UE must start/restart the drx-Inactivity Timer in the next symbol after PDCCH reception. These DCI formats can have only specific sizes, which can be achieved by applying padding or truncation, if needed. Improved systems and methods for DRX configuration are needed.

SUMMARY

Systems and methods for signaling of traffic flow information for Discontinuous Reception (DRX) configuration are provided. In some embodiments, a method of operating a User Equipment (UE) for determining a flow type includes: receiving a configuration of flow identify information with an association between one or more of the group consisting of: Downlink Control Information (DCIs); Radio Network Temporary Identifier (RNTIs); a combination of fields; with one or more DRX configurations among a set of one or more DRX configurations; monitoring a Physical Downlink Control Channel (PDCCH) in DRX Active Time; in response to receiving a PDCCH with DCI indication of a flow type, identifying the DRX configuration k associated to the DCI indication; and starting or restarting a corresponding timer for the identified DRX configuration in the next symbol after PDCCH reception. In this way, signaling for a flow type, DRX configuration, or DRX parameter value indication from a gNB to a UE can be provided, in order to optimize multiple DRX cycle configurations per Serving Cell, where one or more of the configurations are active simultaneously.

In some embodiments, a method performed by a network node for indicating a flow type includes: configuring a UE with an association between one or more of the group consisting of: DCIs; RNTIs; a combination of fields; and a flow identity; with one or more DRX configurations among a set of one or more DRX configurations; transmitting a PDCCH, with DCI indication identifying the corresponding DRX configuration k; and determining that a corresponding timer for the identified DRX configuration is started or restarted in the next symbol after PDCCH.

In some embodiments, the flow identity comprises a Logical Channel ID (LCID) and/or a Radio Bearer (RB).

In some embodiments, the configuration is received via Radio Resource Control (RRC).

In some embodiments, the method also includes: starting or restarting a corresponding timer for all DRX configurations for which its drx-onDurationTimer and/or drx-Inactivity Timer are running at that time.

In some embodiments, the corresponding timer associated to the indicated DRX configuration would apply to all selected corresponding timers.

In some embodiments, the method also includes: starting or restarting a corresponding timer for all DRX configurations for which its drx-onDurationTimer and/or drx-InactivityTimer are running at that time where all selected drx-onDurationTimer and/or drx-Inactivity Timer(s) would apply the value pointed by the index.

In some embodiments, the configuration comprises one or more of the group consisting of: an index indicating a DRX configuration; an index indicating a null/empty/default or special DRX configuration index; an index indicating a specific timer value from a plurality of timer values.

In some embodiments, the plurality of timer values comprises a plurality of drx-Inactivity Timer values.

In some embodiments, the corresponding timer comprises a drx-Inactivity Timer (k).

In some embodiments, if the PDCCH is scrambled with a new RNTI, prioritizing one predetermined drx-InactivityTimer value over all other multiple timers.

In some embodiments, if the PDCCH is scrambled with a new RNTI, interpreting some or all of existing DCI or Uplink Control Information, UCI, fields for a new purpose to identify a flow index information.

In some embodiments, when there is a special physical resource allocation indication for the implicit flow information, prioritizing one drx-InactivityTimer value over all other multiple timers or will extract a flow index information.

In some embodiments, a UE includes: processing circuitry and memory wherein the memory comprises instructions configured to cause the UE to: receive a configuration of flow identify information with an association between one or more of the group consisting of: DCIs; RNTIs; a combination of fields; with one or more DRX configurations among a set of one or more DRX configurations; monitor a PDCCH in DRX Active Time; in response to receiving a PDCCH with DCI indication of a flow type, identify the DRX configuration k associated to the DCI indication; and start or restart a corresponding timer for the identified DRX configuration in a next symbol after the PDCCH reception.

In some embodiments, a network node includes: processing circuitry and memory wherein the memory comprises instructions configured to cause the network node to: configure a UE with an association between one or more of the group consisting of: DCIs; RNTIs; a combination of fields; and a flow identity; with one or more DRX configurations among a set of one or more DRX configurations; transmit a PDCCH with DCI indication identifying the corresponding DRX configuration k; and determine that a corresponding timer for the identified DRX configuration is started or restarted in a next symbol after the PDCCH.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some embodiments of this present disclosure are related to Provisional Application No. 63/240,864, filed 3 Sep. 2021: "Methods for Supporting Multiple DRX Configurations." That application is referred to herein as: [4] and relates to initial solutions to support multiple DRX configurations. Some embodiments of the present disclosure assume that each DRX configuration has a corresponding drx-onDurationTimer, which is started by the UE as disclosed in that previous application.

Figure 1:
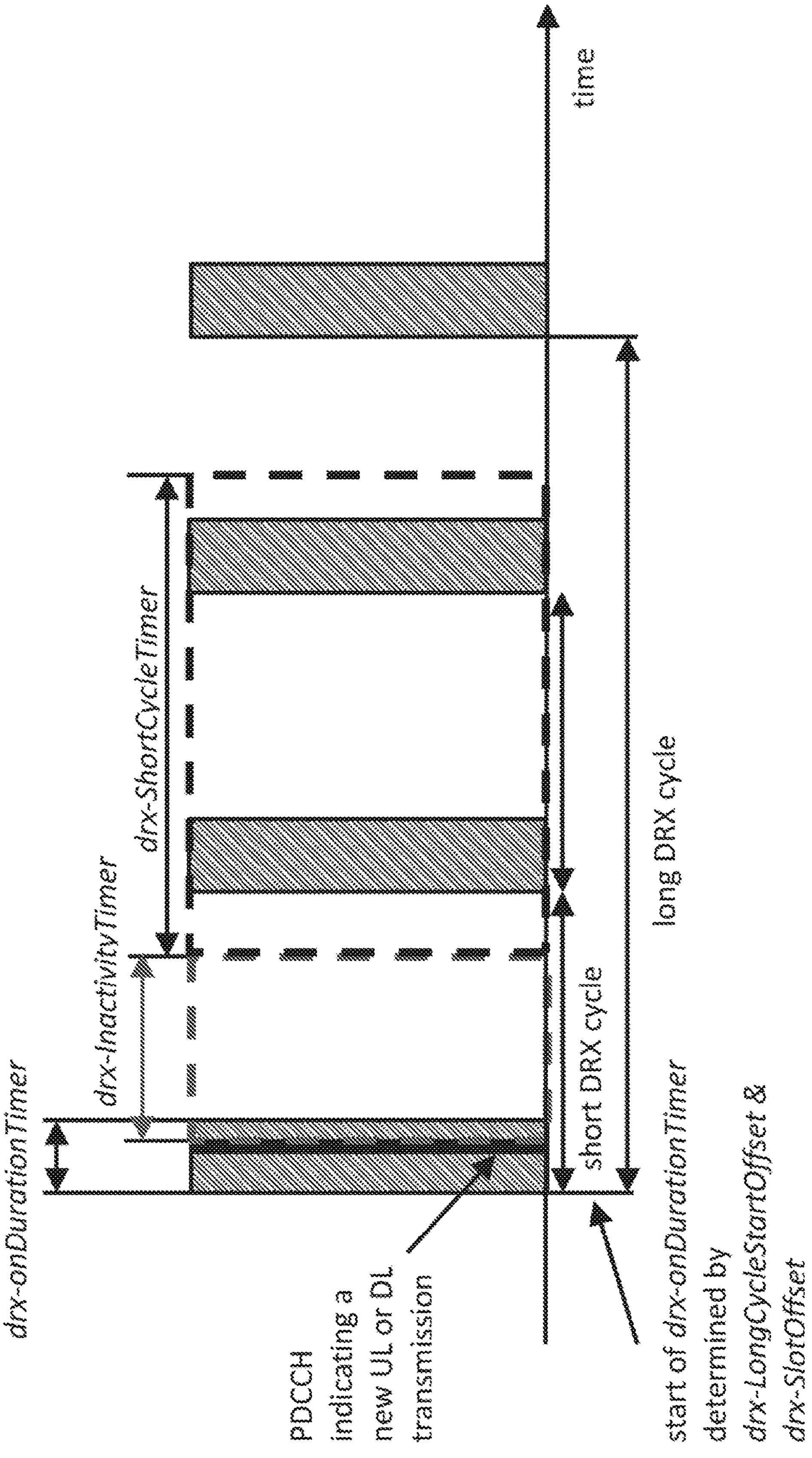
FIG. 1 illustrates a basic User Equipment (UE) Downlink (DL) monitoring when the long and short DRX cycles are configured.
Figure 2:
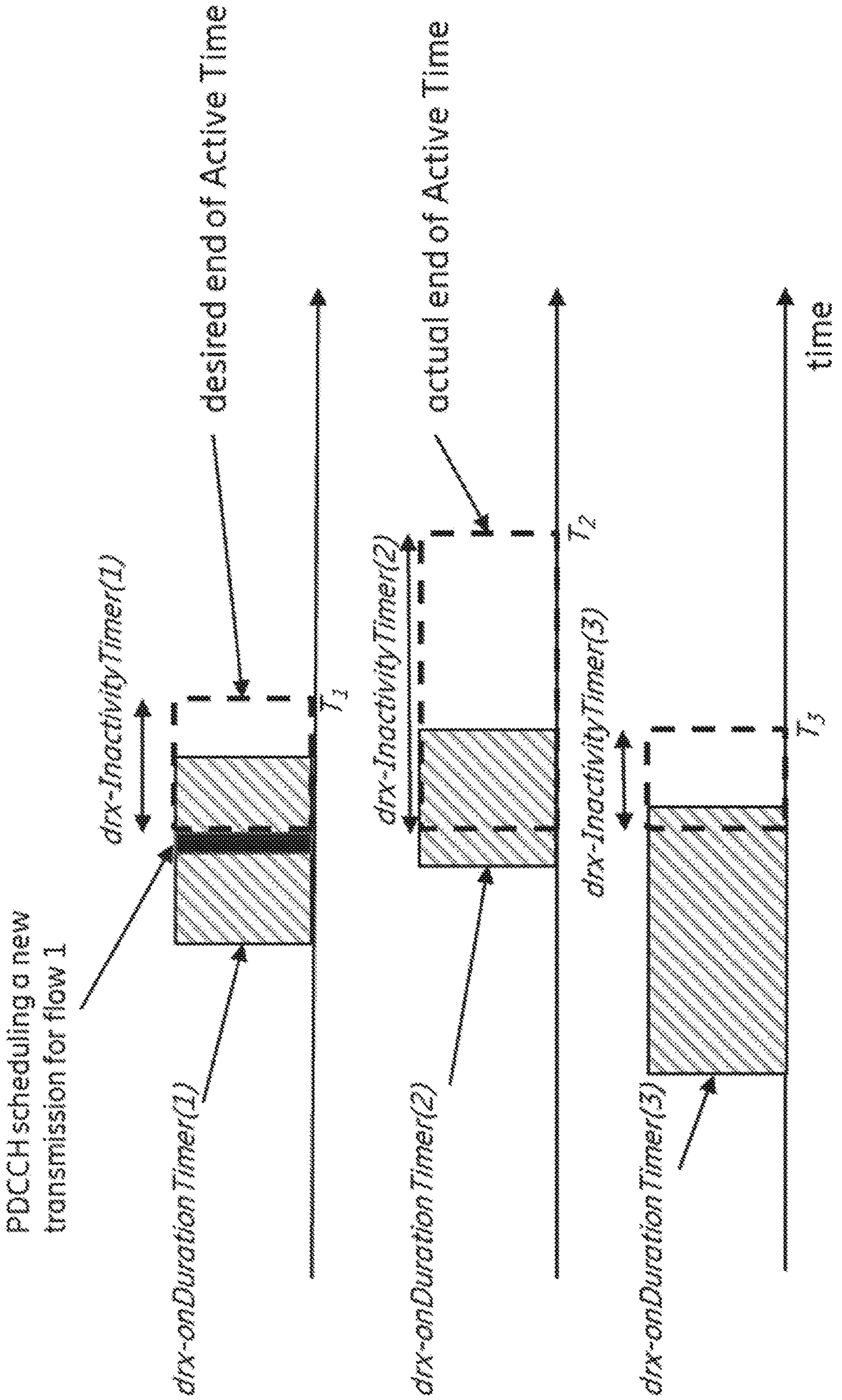
FIG. 2 illustrates the limitation of multiple Discontinuous Reception (DRX) configurations without flow indication where the longest drx-InactivityTimer(2) will run, leading to unnecessary UE power consumption.

There currently exist certain challenges. In [4] support for multiple DRX configurations were proposed where the UE does not have information about which specific data flow is being scheduled by the PDCCH, according to current standard PDCCH specifications. Consequently, when multiple drx-InactivityTimers are implemented by the UE (i.e., one per DRX configuration) in [4], all drx-InactivityTimers of DRX configurations that are in Active Time are (re-)started, regardless of which flow the scheduled data belonged to. This may lead to an increased, unnecessary overall Active Time, due to DRX configurations corresponding to flows that are not being scheduled. This is illustrated in FIG. 2, where the PDCCH schedules a transmission for flow 1, but does not indicate for which flow it is. FIG. 2 illustrates the limitation of multiple DRX configurations without flow indication where the longest drx-InactivityTimer(2) will run, leading to unnecessary UE power consumption [4]. As a result, the UE starts the drx-Inactivity Timers for all three flows, since all three drx-onDuration Timers are running. Since drx-InactivityTimer(2) for flow 2 is the longest, the Active Time ends at moment T2, although the scheduled data is for flow 1 and starting drx-InactivityTimer(1) which ends at T1 would be sufficient.

Certain aspects of the disclosure and their embodiments may provide solutions to these or other challenges. The proposed solution provides signaling for a flow type, DRX configuration, or DRX parameter value indication from a gNB to a UE, in order to optimize multiple DRX cycle configurations per Serving Cell, where one or more of the configurations are active simultaneously. Methods are proposed to modify Layer 1 signaling to indicate information connected to the DRX configuration at the moment of scheduling. This information can then be used at the UE for mapping the scheduled flow to the associated DRX configuration and (re-)starting the corresponding drx-Inactivity-Timer.

Some embodiments of the present disclosure propose methods for dynamic traffic flow indication by L1 and L2 signaling when multiple DRX configurations are activated, in order to signal a UE to properly select/update corresponding specific DRX parameters.

Certain embodiments may provide one or more of the following technical advantage(s). The proposed solution avoids unnecessary start or restart of the drx-Inactivity Timer by fast indication of traffic flow when multiple DRXs are configured, which leads to high power saving gains at the UE.

Figure 3:
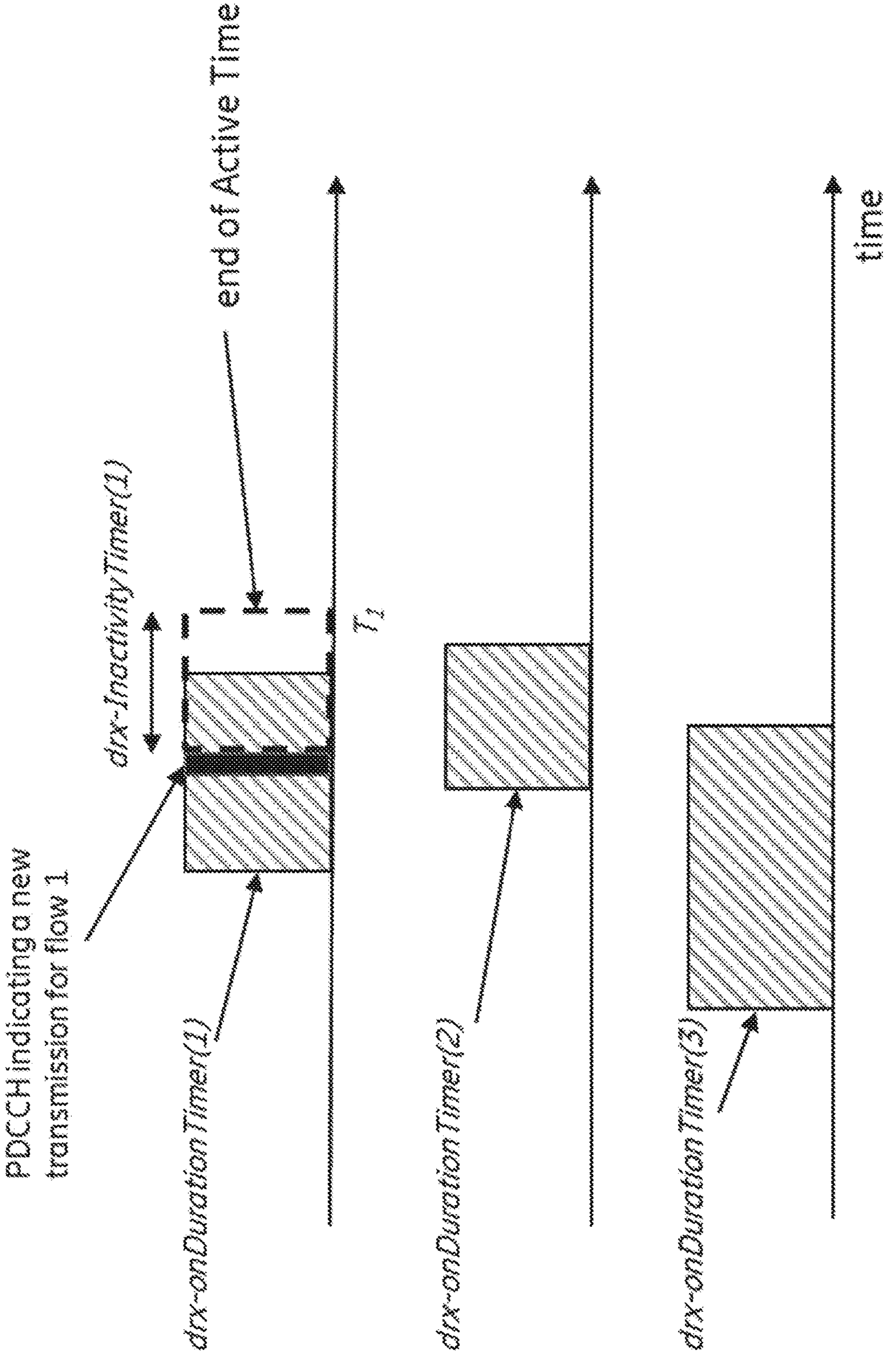
FIG. 3 illustrates a proposed solution, where the Active Time ends at moment T1 instead of T2 in FIG. 2.

Some embodiments of the present disclosure have additional advantages compared to the embodiments proposed in [4]. Specifically, the UE is informed about which traffic flow is being scheduled, so it can map this flow to a stored DRX configuration. Consequently, if multiple drx-Inactivity Timers are implemented, the UE can (re-)start only that timer that corresponds to the scheduled flow. This is shown in FIG. 3 which illustrates a proposed solution, where the Active Time ends at moment T1 instead of T2 in FIG. 2.

Figure 4:
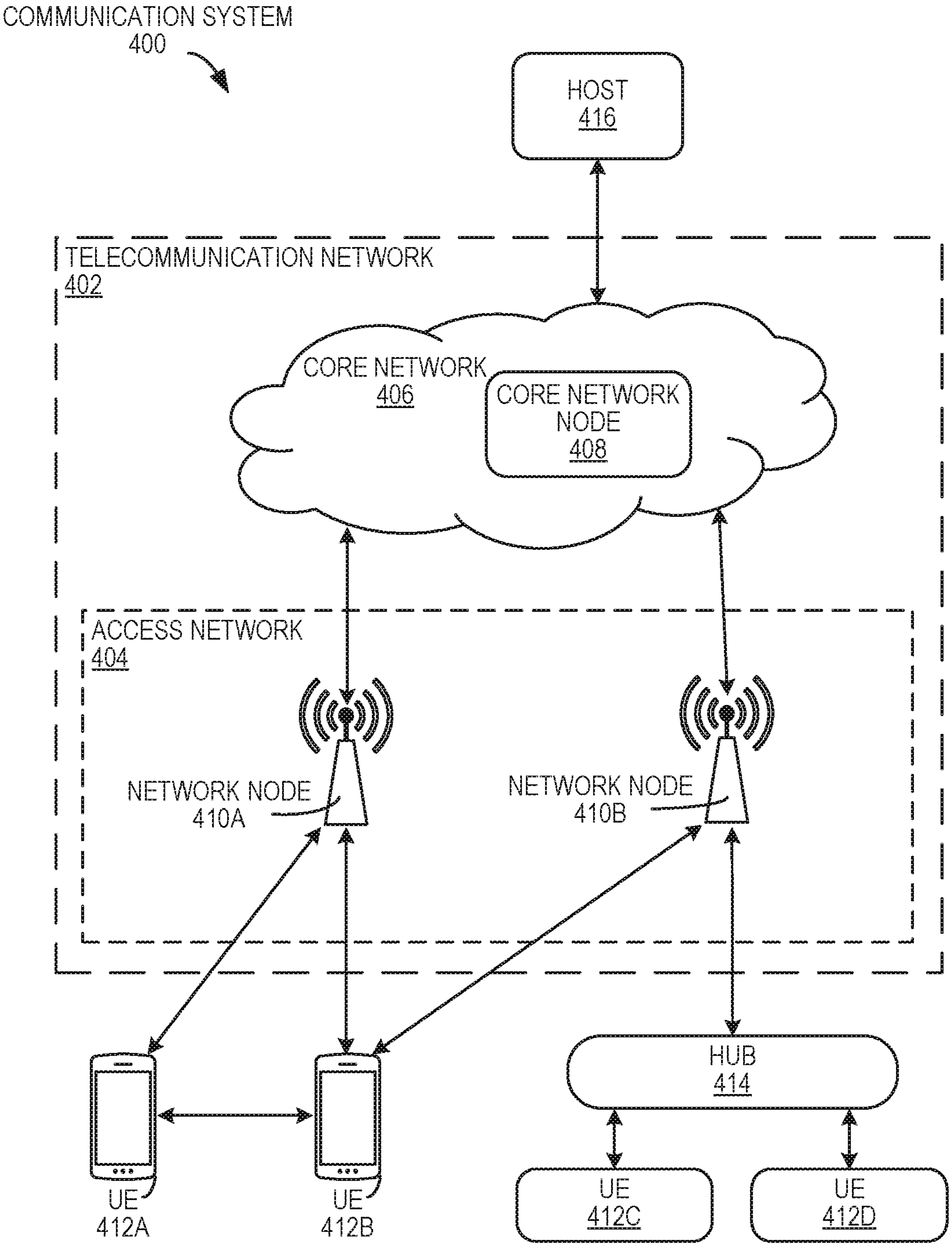
FIG. 4 shows an example of a communication system according to some embodiments of the present disclosure.

FIG. 4 shows an example of a communication system 400 in accordance with some embodiments. In the example, the communication system 400 includes a telecommunication network 402 that includes an access network 404, such as a Radio Access Network (RAN), and a core network 406, which includes one or more core network nodes 408. The access network 404 includes one or more access network nodes, such as network nodes 410A and 410B (one or more of which may be generally referred to as network nodes 410), or any other similar Third Generation Partnership Project (3GPP) access node or non-3GPP Access Point (AP). The network nodes 410 facilitate direct or indirect connection of User Equipment (UE), such as by connecting UEs 412A, 412B, 412C, and 412D (one or more of which may be generally referred to as UEs 412) to the core network 406 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 400 may include any number of wired or wireless networks, network nodes, UEs, and/or any other components or systems that may facilitate or participate in the communication of data and/or signals whether via wired or wireless connections. The communication system 400 may include and/or interface with any type of communication, telecommunication, data, cellular, radio network, and/or other similar type of system.

The UEs 412 may be any of a wide variety of communication devices, including wireless devices arranged, configured, and/or operable to communicate wirelessly with the network nodes 410 and other communication devices. Similarly, the network nodes 410 are arranged, capable, configured, and/or operable to communicate directly or indirectly with the UEs 412 and/or with other network nodes or equipment in the telecommunication network 402 to enable and/or provide network access, such as wireless network access, and/or to perform other functions, such as administration in the telecommunication network 402.

In the depicted example, the core network 406 connects the network nodes 410 to one or more hosts, such as host 416. These connections may be direct or indirect via one or more intermediary networks or devices. In other examples, network nodes may be directly coupled to hosts. The core network 406 includes one more core network nodes (e.g., core network node 408) that are structured with hardware and software components. Features of these components may be substantially similar to those described with respect to the UEs, network nodes, and/or hosts, such that the descriptions thereof are generally applicable to the corresponding components of the core network node 408. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-Concealing Function (SIDF), Unified Data Management (UDM), Security Edge Protection Proxy (SEPP), Network Exposure Function (NEF), and/or a User Plane Function (UPF).

The host 416 may be under the ownership or control of a service provider other than an operator or provider of the access network 404 and/or the telecommunication network 402, and may be operated by the service provider or on behalf of the service provider. The host 416 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 400 of FIG. 4 enables connectivity between the UEs, network nodes, and hosts. In that sense, the communication system 400 may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable Second, Third, Fourth, or Fifth Generation (2G, 3G, 4G, or 5G) standards, or any applicable future generation standard (e.g., Sixth Generation (6G)); Wireless Local Area Network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any Low Power Wide Area Network (LPWAN) standards such as LoRa and Sigfox.

In some examples, the telecommunication network 402 is a cellular network that implements 3GPP standardized features. Accordingly, the telecommunication network 402 may support network slicing to provide different logical networks to different devices that are connected to the telecommunication network 402. For example, the telecommunication network 402 may provide Ultra Reliable Low Latency Communication (URLLC) services to some UEs, while providing enhanced Mobile Broadband (eMBB) services to other UEs, and/or massive Machine Type Communication (mMTC)/massive Internet of Things (IoT) services to yet further UEs.

In some examples, the UEs 412 are configured to transmit and/or receive information without direct human interaction. For instance, a UE may be designed to transmit information to the access network 404 on a predetermined schedule, when triggered by an internal or external event, or in response to requests from the access network 404. Additionally, a UE may be configured for operating in single- or multi-Radio Access Technology (RAT) or multi-standard mode. For example, a UE may operate with any one or combination of WiFi, New Radio (NR), and LTE, i.e., be configured for Multi-Radio Dual Connectivity (MR-DC), such as Evolved UMTS Terrestrial RAN (E-UTRAN) NR-Dual Connectivity (EN-DC).

In the example, a hub 414 communicates with the access network 404 to facilitate indirect communication between one or more UEs (e.g., UE 412C and/or 412D) and network nodes (e.g., network node 410B). In some examples, the hub 414 may be a controller, router, content source and analytics, or any of the other communication devices described herein regarding UEs. For example, the hub 414 may be a broadband router enabling access to the core network 406 for the UEs. As another example, the hub 414 may be a controller that sends commands or instructions to one or more actuators in the UEs. Commands or instructions may be received from the UEs, network nodes 410, or by executable code, script, process, or other instructions in the hub 414. As another example, the hub 414 may be a data collector that acts as temporary storage for UE data and, in some embodiments, may perform analysis or other processing of the data. As another example, the hub 414 may be a content source. For example, for a UE that is a Virtual Reality (VR) headset, display, loudspeaker or other media delivery device, the hub 414 may retrieve VR assets, video, audio, or other media or data related to sensory information via a network node, which the hub 414 then provides to the UE either directly, after performing local processing, and/or after adding additional local content. In still another example, the hub 414 acts as a proxy server or orchestrator for the UEs, in particular in if one or more of the UEs are low energy IoT devices.

The hub 414 may have a constant/persistent or intermittent connection to the network node 410B. The hub 414 may also allow for a different communication scheme and/or schedule between the hub 414 and UEs (e.g., UE 412C and/or 412D), and between the hub 414 and the core network 406. In other examples, the hub 414 is connected to the core network 406 and/or one or more UEs via a wired connection. Moreover, the hub 414 may be configured to connect to a Machine-to-Machine (M2M) service provider over the access network 404 and/or to another UE over a direct connection. In some scenarios, UEs may establish a wireless connection with the network nodes 410 while still connected via the hub 414 via a wired or wireless connection. In some embodiments, the hub 414 may be a dedicated hub—that is, a hub whose primary function is to route communications to/from the UEs from/to the network node 410B. In other embodiments, the hub 414 may be a non-dedicated hub—that is, a device which is capable of operating to route communications between the UEs and the network node 410B, but which is additionally capable of operating as a communication start and/or end point for certain data channels.

In some embodiments, a method to dynamically indicate a flow type via L1 or L2 signaling to optimize multiple DRX configurations when multiple traffic flows are present with a different periodicity are provided.

Traffic Flow Indication for Multiple DRX Operations

The following embodiments are based on the fact that the NW has configured the UE via e.g., Radio Resource Control (RRC) with an association between, for example, DCIs, RNTIs, a combination of fields, a flow identity (e.g., Logical Channel ID (LCID) or Radio Bearer (RB)), with one or more DRX configurations among a set of one or more DRX configurations.

(A) In the first embodiment, the PDCCH may indicate the traffic flow type for corresponding PDSCH data scheduled.

(A1) When a new DL is indicated by the PDCCH, the PDCCH may also indicate an index corresponding to one DRX configuration from a plurality/list of DRX configurations provided to the UE, or to a specific value such as a value for the drx-InactivityTimer among a plurality of values. This index can be indicated 1) by introducing new fields in an existing DCI format or 2) by reusing some of the existing DCI fields but with higher layer signaling to tell the new purpose of the fields for flow indication, or 3) by introducing a new DCI format. In any case, the mapping between a specific DCI indication and a corresponding DRX configuration set should be predetermined.

(A2) It is also possible that the existing DCI can be scrambled with a new RNTI, in order to indicate the special purpose of the DCI. For example, a gNB can signal a UE that the new scrambled DCI is intended for the UE to choose a predetermined drx-InactivityTimer out of multiple timers, which can be the shortest or the longest. In another example, the new RNTI with existing DCI format can tell a UE a different purpose of bits in existing DCI fields that at the end works as a short message of detailed flow information. The detailed flow information can be the slot index of start and/or end time of resource allocation of corresponding traffic flow. This can be useful for a UE to choose which DRX parameter set to be used for an indicated time window.

(A3) Instead of using a new RNTI, a special configuration of existing physical resource allocation can implicitly indicate a UE the flow information. As non-limiting examples, a special CCE (control channel element) allocation, a special time (or frequency)

domain resource assignment, or a special HARQ process number can be sent in DCI, which can be reserved in advance by RRC signaling, and then a UE will choose the predetermined drx-InactivityTimer. It is also possible to combine all those dimensions of the CCE allocation, the special time-frequency domain resource assignment, a special HARQ process in order to deliver more traffic flow information.

As non-limiting examples, all the above flow indication via PDCCH can also be applied for PDCCH for uplink PUSCH transmission by Uplink Control Information (UCI). This allows a UE to indicate a traffic flow information without waiting for DCI transmission.

(B) The second embodiment is extracting LCID/flow information in the MAC PDU:

(B1) In a MAC PDU, each MAC subheader contains an LCID which indicates if the MAC subPDU is user data/signaling, i.e., RBs, or if the MAC subPDU is a MAC CE. For each DRX configuration that the NW wants to affect, the network will include 1-bit indication in the MAC subheader, corresponding to an RB associated to one of the DRX configurations which the network wants to affect.

(B2) Alternatively to the above, a MAC CE could be added in the MAC PDU to include one or more indexes, e.g., DRX configuration index/LCID/flow. These indexes can indicate:

a) flows for which there is no more data in the current DRX cycle, or b) flows that have already been scheduled by PDCCH, but not yet transmitted in a PDSCH/PUSCH, or c) DRX configuration which does not need to re-start the inactivity timer.

UE Behavior at the Reception of Flow Indication

In some embodiments, corresponding methods for the UE to operate DRX after receiving the flow indication are provided. When a network (e.g., gNB) sends multiple selected DRX cycle configurations to the UE, which can be numbered from 1 to n, the UE can know which DRX is coupled with which LCID/RB.

Figure 5:
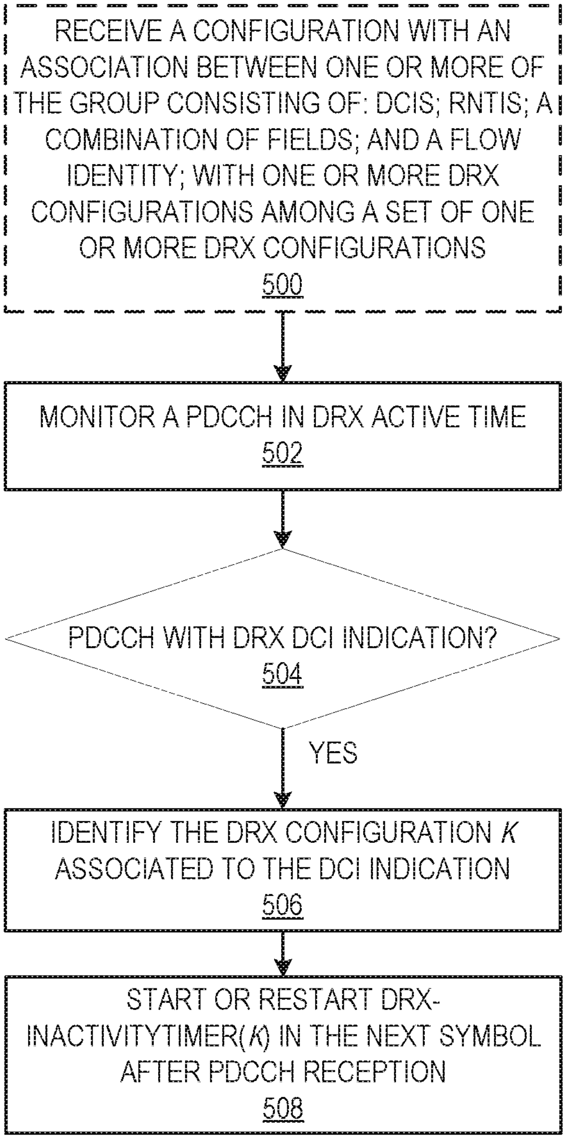
FIG. 5 illustrates a proposed modifications for the UE to combine the multiple DRX cycle configurations, in order to start/restart the drx-InactivityTimers, according to some embodiments of the present disclosure.

FIG. 5 illustrates a proposed modifications for the UE to combine the multiple DRX cycle configurations, in order to start/restart the drx-InactivityTimers. The proposed modifications compared to the 3GPP Rel-16 solution are shown in bold. Parameter k refers to any of the 1 to n DRX cycle configurations. The UE receives a configuration with an association between one or more of the group consisting of: DCIs; RNTIs; a combination of fields; and a flow identity; with one or more DRX configurations among a set of one or more DRX configurations (step 500); monitors a PDCCH in DRX Active Time (step 502); in response to receiving a PDCCH with DRX DCI indication, identifies (500) the DRX configuration k associated to the DCI indication (step 504); and/or starts or restarts drx-Inactivity Timer (k) in the next symbol after PDCCH reception (step 508).

In some embodiments, the UE starts/restarts/stops the drx-InactivityTimers depending on whether and which flows are indicated by the network, as follows.

(A) If the PDCCH indicates the traffic flow type:

(A1) If the PDCCH indicates an index:

(A1.1) If the index indicates a DRX configuration:

a) The UE starts or re-starts the corresponding timers (e.g., drx-InactivityTimer) for the indicated DRX configuration, if its drx-onDurationTimer and/or drx-InactivityTimer is running at that time, while the other DRX configurations would not be affected (see FIG. 5), or b) The UE starts or re-starts the drx-InactivityTimer for all DRX configurations for which its drx-onDurationTimer and/or drx-InactivityTimer are running at that time. One option follows:

b.1) One option is that the drx-InactivityTimer associated to the indicated DRX configuration would apply to all selected drx-InactivityTimer(s); alternatively.

(A1.2) If the index indicates a null/empty/default or special DRX configuration index:

a) The UE starts or re-starts the drx-InactivityTimer for all DRX configurations given the drx-onDurationTimer and/or drx-InactivityTimer for each associated DRX configuration is running at that time. The value to apply for each started or re-started timer is the corresponding for its own configuration.

(A1.3) If the index indicates a specific timer value from a plurality of timer (e.g., drx-InactivityTimer) values:

a) The UE starts or re-starts the drx-InactivityTimer for all DRX configurations given the drx-onDurationTimer and/or drx-InactivityTimer for each associated DRX configuration is running at that time. All selected drx-InactivityTimer(s) would apply the value pointed by the index.

(A2) If the PDCCH is scrambled with a new RNTI, a UE can have two different cases to follow. First, it can prioritize one predetermined drx-InactivityTimer value over all other multiple timers. Second, a UE interprets some or all of existing DCI or UCI fields for a new purpose to identify a flow index information and follows the same procedure described in A1.1 and A1.2 above.

(A3) When there is a special physical resource allocation indication for the implicit flow information (as described in 6.1.1-A3), a UE will prioritize one drx-InactivityTimer value over all other multiple timers or will extract a flow index information to follow the same procedure in A1.1 and A1.2 above.

After the UE performs the actions in one of the steps above (A1/2/3), the UE will eventually enter the sleep period and will stop monitoring the PDCCH. When the following DRX period starts, for those DRX configurations which modified their values, the UE will follow one of the following:

The UE would continue using the timer values associated to the DRX configuration indicated by the index, or The UE would re-apply the timer values initially provided in the RRC configuration for each corresponding DRX configuration.

(B) Prior to the UE receiving a PDSCH, a PDCCH is received by the UE. When the UE receives a PDCCH indicating a new transmission, it starts/restarts all drx-InactivityTimers of DRX configurations for which the drx-onDurationTimer and/or drx-InactivityTimer are running, as in our proposal in [4]. Additionally, the UE extracts flow information/LCID(s) from the MAC PDU transmitted in the PDSCH:

(B1) When the UE receives a PDSCH, it extracts the LCID from the MAC subheaders of the MAC PDU and checks if the additional field indicates the end of the traffic for this LCID. If the end of the traffic is indicated, the UE will not restart the drx-Inactivity-Timer for the DRX configuration associated with this LCID until its next DRX cycle.

(B2) Alternatively, if there is a MAC CE in the MAC PDU indicating index(es): B2.a) If the index(es) indicate flows for which there is no more data, the UE will not restart the drx-InactivityTimer for the DRX configuration(s) associated with them, until their next respective DRX cycle; or B2.b) If the index(es) indicate flows that have already been scheduled by PDCCH, but are not yet transmitted, the UE can stop all running drx-InactivityTimers that do not correspond to DRX configurations associated with the indicated flows or with the LCID in the current MAC subheader.

B2.c) If the index(es) indicate a DRX configuration, the UE will not restart the drx-InactivityTimer for the indicated DRX configuration(s). Alternatively, the UE will restart the drx-InactivityTimer for the indicated DRX configuration(s).

(B3) Alternatively to (B1/2), the UE can increment a counter for every PDCCH scheduling new DL/UL transmissions. When a scheduled PDSCH/PUSCH for a new transmission occurs, the UE decrements this counter. If the counter is zero (i.e., no new DL/UL transmission is expected after this one), the UE can check the LCID(s) in the current PDSCH/PUSCH and can stop all running drx-InactivityTimers of DRX configurations that are not associated with the LCID(s) in the current PDSCH/PUSCH.

Figure 6:
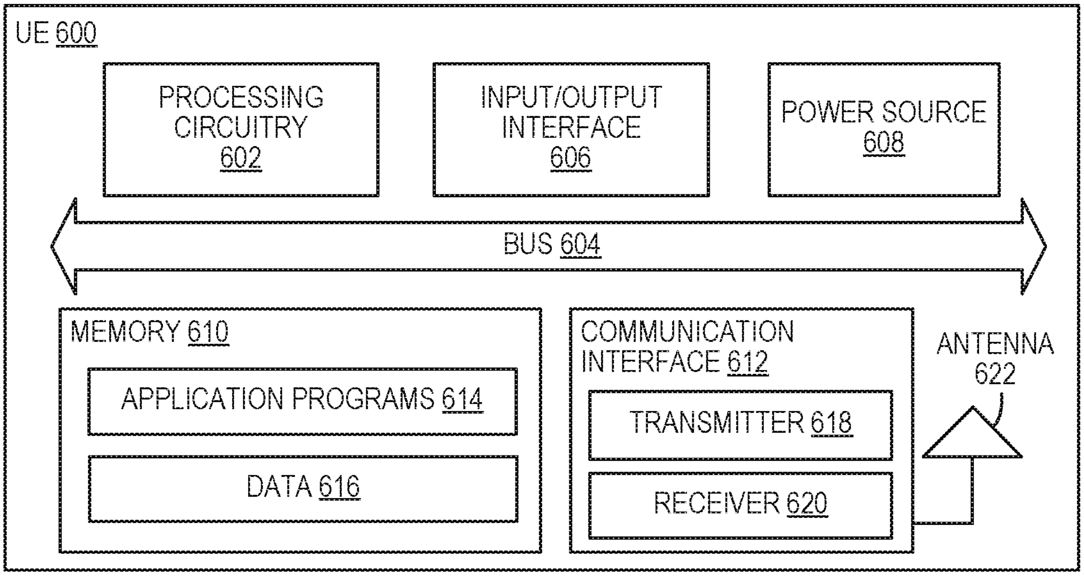
FIG. 6 shows a UE, according to some embodiments of the present disclosure.

FIG. 6 shows a UE 600 in accordance with some embodiments. As used herein, a UE refers to a device capable, configured, arranged, and/or operable to communicate wirelessly with network nodes and/or other UEs. Examples of a UE include, but are not limited to, a smart phone, mobile phone, cell phone, Voice over Internet Protocol (VOIP) phone, wireless local loop phone, desktop computer, Personal Digital Assistant (PDA), wireless camera, gaming console or device, music storage device, playback appliance, wearable terminal device, wireless endpoint, mobile station, tablet, laptop, Laptop Embedded Equipment (LEE), Laptop Mounted Equipment (LME), smart device, wireless Customer Premise Equipment (CPE), vehicle-mounted or vehicle embedded/integrated wireless device, etc. Other examples include any UE identified by the 3GPP, including a Narrowband Internet of Things (NB-IoT) UE, a Machine Type Communication (MTC) UE, and/or an enhanced MTC (eMTC) UE.

A UE may support Device-to-Device (D2D) communication, for example by implementing a 3GPP standard for sidelink communication, Dedicated Short-Range Communication (DSRC), Vehicle-to-Vehicle (V2V), Vehicle-to-Infrastructure (V2I), or Vehicle-to-Everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 600 includes processing circuitry 602 that is operatively coupled via a bus 604 to an input/output interface 606, a power source 608, memory 610, a communication interface 612, and/or any other component, or any combination thereof. Certain UEs may utilize all or a subset of the components shown in FIG. 6. The level of integration between the components may vary from one UE to another UE. Further, certain UEs may contain multiple instances of a component, such as multiple processors, memories, transceivers, transmitters, receivers, etc.

The processing circuitry 602 is configured to process instructions and data and may be configured to implement any sequential state machine operative to execute instructions stored as machine-readable computer programs in the memory 610. The processing circuitry 602 may be implemented as one or more hardware-implemented state machines (e.g., in discrete logic, Field Programmable Gate Arrays (FPGAs), Application Specific Integrated Circuits (ASICs), etc.); programmable logic together with appropriate firmware; one or more stored computer programs, general purpose processors, such as a microprocessor or Digital Signal Processor (DSP), together with appropriate software; or any combination of the above. For example, the processing circuitry 602 may include multiple Central Processing Units (CPUs).

In the example, the input/output interface 606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 608 is structured as a battery or battery pack. Other types of power sources, such as an external power source (e.g., an electricity outlet), photovoltaic device, or power cell, may be used. The power source 608 may further include power circuitry for delivering power from the power source 608 itself, and/or an external power source, to the various parts of the UE 600 via input circuitry or an interface such as an electrical power cable. Delivering power may be, for example, for charging the power source 608. Power circuitry may perform any formatting, converting, or other modification to the power from the power source 608 to make the power suitable for the respective components of the UE 600 to which power is supplied.

The memory 610 may be or be configured to include memory such as Random Access Memory (RAM), Read Only Memory (ROM), Programmable ROM (PROM), Erasable PROM (EPROM), Electrically EPROM (EEPROM), magnetic disks, optical disks, hard disks, removable cartridges, flash drives, and so forth. In one example, the memory 610 includes one or more application programs 614, such as an operating system, web browser application, a widget, gadget engine, or other application, and corresponding data 616. The memory 610 may store, for use by the UE 600, any of a variety of various operating systems or combinations of operating systems.

The memory 610 may be configured to include a number of physical drive units, such as Redundant Array of Independent Disks (RAID), flash memory, USB flash drive, external hard disk drive, thumb drive, pen drive, key drive, High Density Digital Versatile Disc (HD-DVD) optical disc drive, internal hard disk drive, Blu-Ray optical disc drive, Holographic Digital Data Storage (HDDS) optical disc drive, external mini Dual In-line Memory Module (DIMM), Synchronous Dynamic RAM (SDRAM), external micro-DIMM SDRAM, smartcard memory such as a tamper resistant module in the form of a Universal Integrated Circuit Card (UICC) including one or more Subscriber Identity Modules (SIMs), such as a Universal SIM (USIM) and/or Internet Protocol Multimedia Services Identity Module (ISIM), other memory, or any combination thereof. The UICC may for example be an embedded UICC (eUICC), integrated UICC (iUICC) or a removable UICC commonly known as a 'SIM card.' The memory 610 may allow the UE 600 to access instructions, application programs, and the like stored on transitory or non-transitory memory media, to off-load data, or to upload data. An article of manufacture, such as one utilizing a communication system, may be tangibly embodied as or in the memory 610, which may be or comprise a device-readable storage medium.

The processing circuitry 602 may be configured to communicate with an access network or other network using the communication interface 612. The communication interface 612 may comprise one or more communication subsystems and may include or be communicatively coupled to an antenna 622. The communication interface 612 may include one or more transceivers used to communicate, such as by communicating with one or more remote transceivers of another device capable of wireless communication (e.g., another UE or a network node in an access network). Each transceiver may include a transmitter 618 and/or a receiver 620 appropriate to provide network communications (e.g., optical, electrical, frequency allocations, and so forth). Moreover, the transmitter 618 and receiver 620 may be coupled to one or more antennas (e.g., the antenna 622) and may share circuit components, software, or firmware, or alternatively be implemented separately.

In the illustrated embodiment, communication functions of the communication interface 612 may include cellular communication, WiFi communication, LPWAN communication, data communication, voice communication, multimedia communication, short-range communications such as Bluetooth, NFC, location-based communication such as the use of the Global Positioning System (GPS) to determine a location, another like communication function, or any combination thereof. Communications may be implemented according to one or more communication protocols and/or standards, such as IEEE 802.11, Code Division Multiplexing Access (CDMA), Wideband CDMA (WCDMA), GSM, LTE, NR, UMTS, WiMax, Ethernet, Transmission Control Protocol/Internet Protocol (TCP/IP), Synchronous Optical Networking (SONET), Asynchronous Transfer Mode (ATM), Quick User Datagram Protocol Internet Connection (QUIC), Hypertext Transfer Protocol (HTTP), and so forth.

Regardless of the type of sensor, a UE may provide an output of data captured by its sensors, through its communication interface 612, or via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an IoT device, may be a device for use in one or more application domains, these domains comprising, but not limited to, city wearable technology, extended industrial application, and healthcare. Non-limiting examples of such an IoT device are a device which is or which is embedded in: a connected refrigerator or freezer, a television, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or VR, a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 600 shown in FIG. 6.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship, an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator and handle communication of data for both the speed sensor and the actuators.

Figure 7:
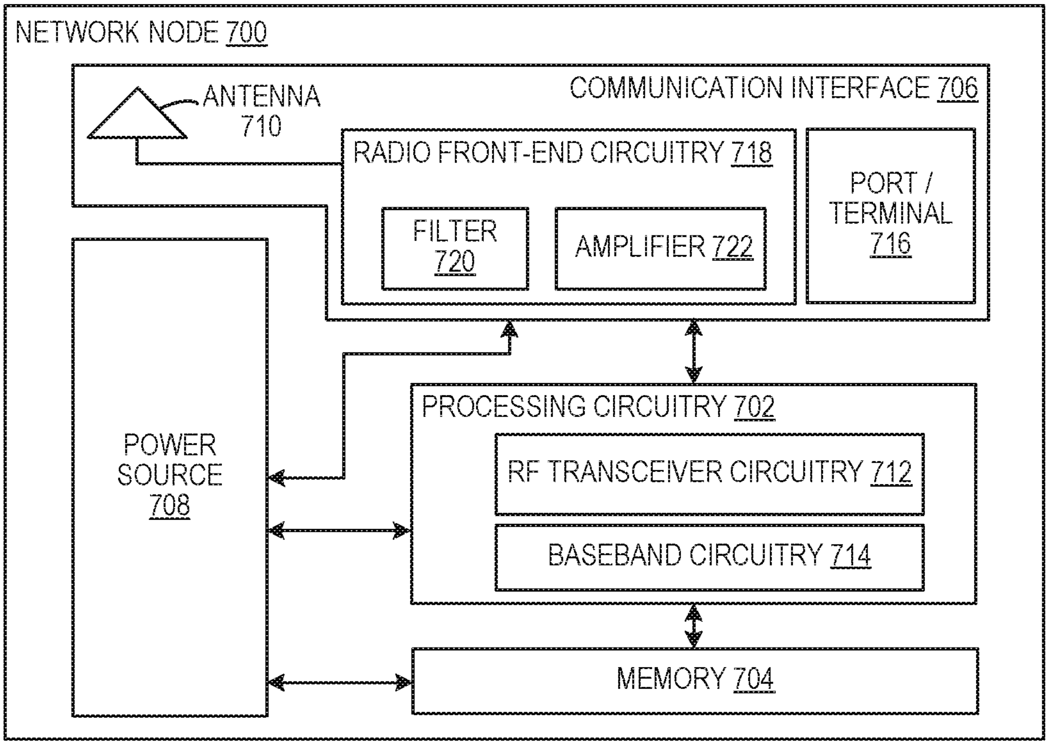
FIG. 7 shows a network node, according to some embodiments of the present disclosure.

FIG. 7 shows a network node 700 in accordance with some embodiments. As used herein, network node refers to equipment capable, configured, arranged, and/or operable to communicate directly or indirectly with a UE and/or with other network nodes or equipment in a telecommunication network. Examples of network nodes include, but are not limited to, APs (e.g., radio APs), Base Stations (BSs) (e.g., radio BSs, Node Bs, evolved Node Bs (eNBs), and NR Node Bs (gNBs)).

BSs may be categorized based on the amount of coverage they provide (or, stated differently, their transmit power level) and so, depending on the provided amount of coverage, may be referred to as femto BSs, pico BSs, micro BSs, or macro BSs. A BS may be a relay node or a relay donor node controlling a relay. A network node may also include one or more (or all) parts of a distributed radio BS such as centralized digital units and/or Remote Radio Units (RRUs), sometimes referred to as Remote Radio Heads (RRHs). Such RRUs may or may not be integrated with an antenna as an antenna integrated radio. Parts of a distributed radio BS may also be referred to as nodes in a Distributed Antenna System (DAS).

Other examples of network nodes include multiple Transmission Point (multi-TRP) 5G access nodes, Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 700 includes processing circuitry 702, memory 704, a communication interface 706, and a power source 708. The network node 700 may be composed of multiple physically separate components (e.g., a Node B component and an RNC component, or a BTS component and a BSC component, etc.), which may each have their own respective components. In certain scenarios in which the network node 700 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 700 may be configured to support multiple RATs. In such embodiments, some components may be duplicated (e.g., separate memory 704 for different RATs) and some components may be reused (e.g., an antenna 710 may be shared by different RATs). The network node 700 may also include multiple sets of the various illustrated components for different wireless technologies integrated into network node 700, for example GSM, WCDMA, LTE, NR, WiFi, Zigbee, Z-wave, Long Range Wide Area Network (LoRaWAN), Radio Frequency Identification (RFID), or Bluetooth wireless technologies. These wireless technologies may be integrated into the same or different chip or set of chips and other components within the network node 700.

The processing circuitry 702 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other network node 700 components, such as the memory 704, to provide network node 700 functionality.

In some embodiments, the processing circuitry 702 includes a System on a Chip (SOC). In some embodiments, the processing circuitry 702 includes one or more of Radio Frequency (RF) transceiver circuitry 712 and baseband processing circuitry 714. In some embodiments, the RF transceiver circuitry 712 and the baseband processing circuitry 714 may be on separate chips (or sets of chips), boards, or units, such as radio units and digital units. In alternative embodiments, part or all of the RF transceiver circuitry 712 and the baseband processing circuitry 714 may be on the same chip or set of chips, boards, or units.

The memory 704 may comprise any form of volatile or non-volatile computer-readable memory including, without limitation, persistent storage, solid state memory, remotely mounted memory, magnetic media, optical media, RAM, ROM, mass storage media (for example, a hard disk), removable storage media (for example, a flash drive, a Compact Disk (CD), or a Digital Video Disk (DVD)), and/or any other volatile or non-volatile, non-transitory device-readable, and/or computer-executable memory devices that store information, data, and/or instructions that may be used by the processing circuitry 702. The memory 704 may store any suitable instructions, data, or information, including a computer program, software, an application including one or more of logic, rules, code, tables, and/or other instructions capable of being executed by the processing circuitry 702 and utilized by the network node 700. The memory 704 may be used to store any calculations made by the processing circuitry 702 and/or any data received via the communication interface 706. In some embodiments, the processing circuitry 702 and the memory 704 are integrated.

The communication interface 706 is used in wired or wireless communication of signaling and/or data between a network node, access network, and/or UE. As illustrated, the communication interface 706 comprises port(s)/terminal(s) 716 to send and receive data, for example to and from a network over a wired connection. The communication interface 706 also includes radio front-end circuitry 718 that may be coupled to, or in certain embodiments a part of, the antenna 710. The radio front-end circuitry 718 comprises filters 720 and amplifiers 722. The radio front-end circuitry 718 may be connected to the antenna 710 and the processing circuitry 702. The radio front-end circuitry 718 may be configured to condition signals communicated between the antenna 710 and the processing circuitry 702. The radio front-end circuitry 718 may receive digital data that is to be sent out to other network nodes or UEs via a wireless connection. The radio front-end circuitry 718 may convert the digital data into a radio signal having the appropriate channel and bandwidth parameters using a combination of the filters 720 and/or the amplifiers 722. The radio signal may then be transmitted via the antenna 710. Similarly, when receiving data, the antenna 710 may collect radio signals which are then converted into digital data by the radio front-end circuitry 718. The digital data may be passed to the processing circuitry 702. In other embodiments, the communication interface 706 may comprise different components and/or different combinations of components.

In certain alternative embodiments, the network node 700 does not include separate radio front-end circuitry 718; instead, the processing circuitry 702 includes radio front-end circuitry and is connected to the antenna 710. Similarly, in some embodiments, all or some of the RF transceiver circuitry 712 is part of the communication interface 706. In still other embodiments, the communication interface 706 includes the one or more ports or terminals 716, the radio front-end circuitry 718, and the RF transceiver circuitry 712 as part of a radio unit (not shown), and the communication interface 706 communicates with the baseband processing circuitry 714, which is part of a digital unit (not shown).

The antenna 710 may include one or more antennas, or antenna arrays, configured to send and/or receive wireless signals. The antenna 710 may be coupled to the radio front-end circuitry 718 and may be any type of antenna capable of transmitting and receiving data and/or signals wirelessly. In certain embodiments, the antenna 710 is separate from the network node 700 and connectable to the network node 700 through an interface or port.

The antenna 710, the communication interface 706, and/or the processing circuitry 702 may be configured to perform any receiving operations and/or certain obtaining operations described herein as being performed by the network node 700. Any information, data, and/or signals may be received from a UE, another network node, and/or any other network equipment. Similarly, the antenna 710, the communication interface 706, and/or the processing circuitry 702 may be configured to perform any transmitting operations described herein as being performed by the network node 700. Any information, data, and/or signals may be transmitted to a UE, another network node, and/or any other network equipment.

The power source 708 provides power to the various components of the network node 700 in a form suitable for the respective components (e.g., at a voltage and current level needed for each respective component). The power source 708 may further comprise, or be coupled to, power management circuitry to supply the components of the network node 700 with power for performing the functionality described herein. For example, the network node 700 may be connectable to an external power source (e.g., the power grid or an electricity outlet) via input circuitry or an interface such as an electrical cable, whereby the external power source supplies power to power circuitry of the power source 708. As a further example, the power source 708 may comprise a source of power in the form of a battery or battery pack which is connected to, or integrated in, power circuitry. The battery may provide backup power should the external power source fail.

Embodiments of the network node 700 may include additional components beyond those shown in FIG. 7 for providing certain aspects of the network node's functionality, including any of the functionality described herein and/or any functionality necessary to support the subject matter described herein. For example, the network node 700 may include user interface equipment to allow input of information into the network node 700 and to allow output of information from the network node 700. This may allow a user to perform diagnostic, maintenance, repair, and other administrative functions for the network node 700.

Figure 8:
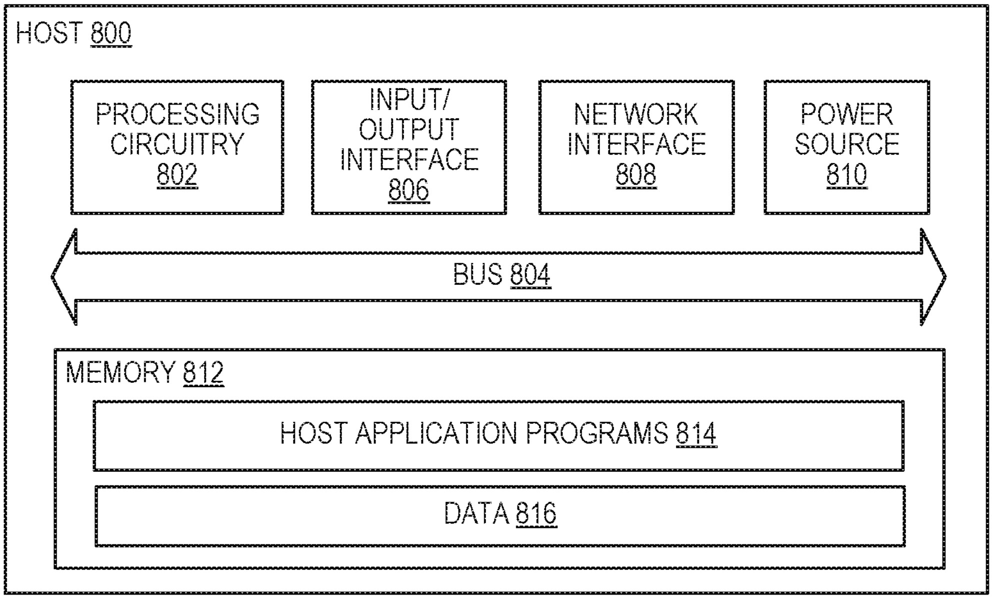
FIG. 8 is a block diagram of a host, which may be an embodiment of the host of FIG. 4, according to some embodiments of the present disclosure.

FIG. 8 is a block diagram of a host 800, which may be an embodiment of the host 416 of FIG. 4, in accordance with various aspects described herein. As used herein, the host 800 may be or comprise various combinations of hardware and/or software including a standalone server, a blade server, a cloud-implemented server, a distributed server, a virtual machine, container, or processing resources in a server farm. The host 800 may provide one or more services to one or more UEs.

The host 800 includes processing circuitry 802 that is operatively coupled via a bus 804 to an input/output interface 806, a network interface 808, a power source 810, and memory 812. Other components may be included in other embodiments. Features of these components may be substantially similar to those described with respect to the devices of previous figures, such as FIGS. 6 and 7, such that the descriptions thereof are generally applicable to the corresponding components of the host 800.

The memory 812 may include one or more computer programs including one or more host application programs 814 and data 816, which may include user data, e.g., data generated by a UE for the host 800 or data generated by the host 800 for a UE. Embodiments of the host 800 may utilize only a subset or all of the components shown. The host application programs 814 may be implemented in a container-based architecture and may provide support for video codecs (e.g., Versatile Video Coding (VVC), High Efficiency Video Coding (HEVC), Advanced Video Coding (AVC), Moving Picture Experts Group (MPEG), VP9) and audio codecs (e.g., Free Lossless Audio Codec (FLAC), Advanced Audio Coding (AAC), MPEG, G.711), including transcoding for multiple different classes, types, or implementations of UEs (e.g., handsets, desktop computers, wearable display systems, and heads-up display systems). The host application programs 814 may also provide for user authentication and licensing checks and may periodically report health, routes, and content availability to a central node, such as a device in or on the edge of a core network. Accordingly, the host 800 may select and/or indicate a different host for Over-The-Top (OTT) services for a UE. The host application programs 814 may support various protocols, such as the HTTP Live Streaming (HLS) protocol, Real-Time Messaging Protocol (RTMP), Real-Time Streaming Protocol (RTSP), Dynamic Adaptive Streaming over HTTP (DASH or MPEG-DASH), etc.

Figure 9:
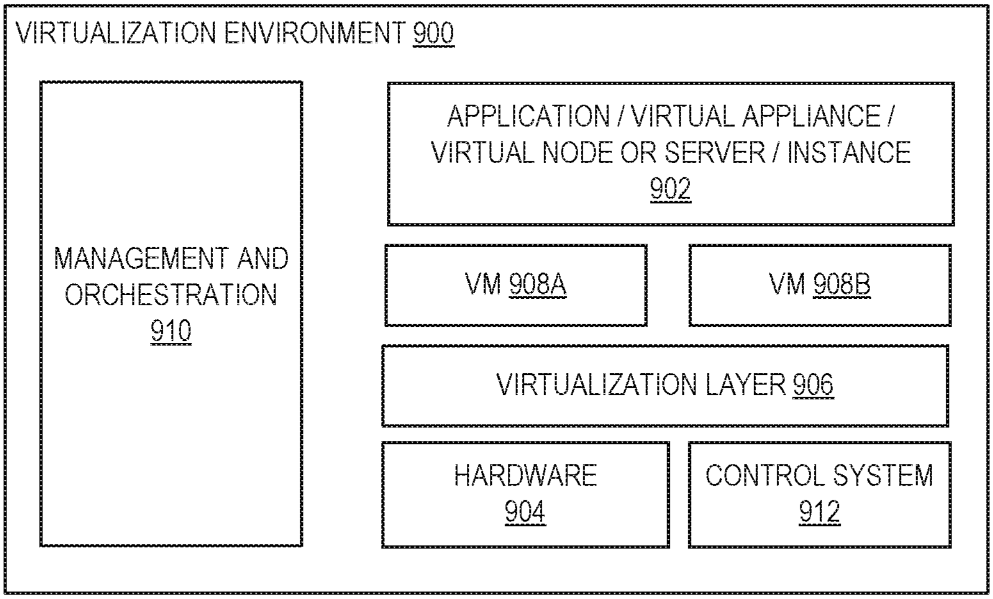
FIG. 9 is a block diagram illustrating a virtualization environment in which functions implemented by some embodiments may be virtualized.

FIG. 9 is a block diagram illustrating a virtualization environment 900 in which functions implemented by some embodiments may be virtualized. In the present context, virtualizing means creating virtual versions of apparatuses or devices which may include virtualizing hardware platforms, storage devices, and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more Virtual Machines (VMs) implemented in one or more virtual environments 900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 902 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 904 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 906 (also referred to as hypervisors or VM Monitors (VMMs)), provide VMs 908A and 908B (one or more of which may be generally referred to as VMs 908), and/or perform any of the functions, features, and/or benefits described in relation with some embodiments described herein. The virtualization layer 906 may present a virtual operating platform that appears like networking hardware to the VMs 908.

The VMs 908 comprise virtual processing, virtual memory, virtual networking, or interface and virtual storage, and may be run by a corresponding virtualization layer 906. Different embodiments of the instance of a virtual appliance 902 may be implemented on one or more of the VMs 908, and the implementations may be made in different ways. Virtualization of the hardware is in some contexts referred to as Network Function Virtualization (NFV). NFV may be used to consolidate many network equipment types onto industry standard high volume server hardware, physical switches, and physical storage, which can be located in data centers and customer premise equipment.

In the context of NFV, a VM 908 may be a software implementation of a physical machine that runs programs as if they were executing on a physical, non-virtualized machine. Each of the VMs 908, and that part of the hardware 904 that executes that VM, be it hardware dedicated to that VM and/or hardware shared by that VM with others of the VMs 908, forms separate virtual network elements. Still in the context of NFV, a virtual network function is responsible for handling specific network functions that run in one or more VMs 908 on top of the hardware 904 and corresponds to the application 902.

The hardware 904 may be implemented in a standalone network node with generic or specific components. The hardware 904 may implement some functions via virtualization. Alternatively, the hardware 904 may be part of a larger cluster of hardware (e.g., such as in a data center or CPE) where many hardware nodes work together and are managed via management and orchestration 910, which, among others, oversees lifecycle management of the applications 902. In some embodiments, the hardware 904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a RAN or a BS. In some embodiments, some signaling can be provided with the use of a control system 912 which may alternatively be used for communication between hardware nodes and radio units.

Figure 10:
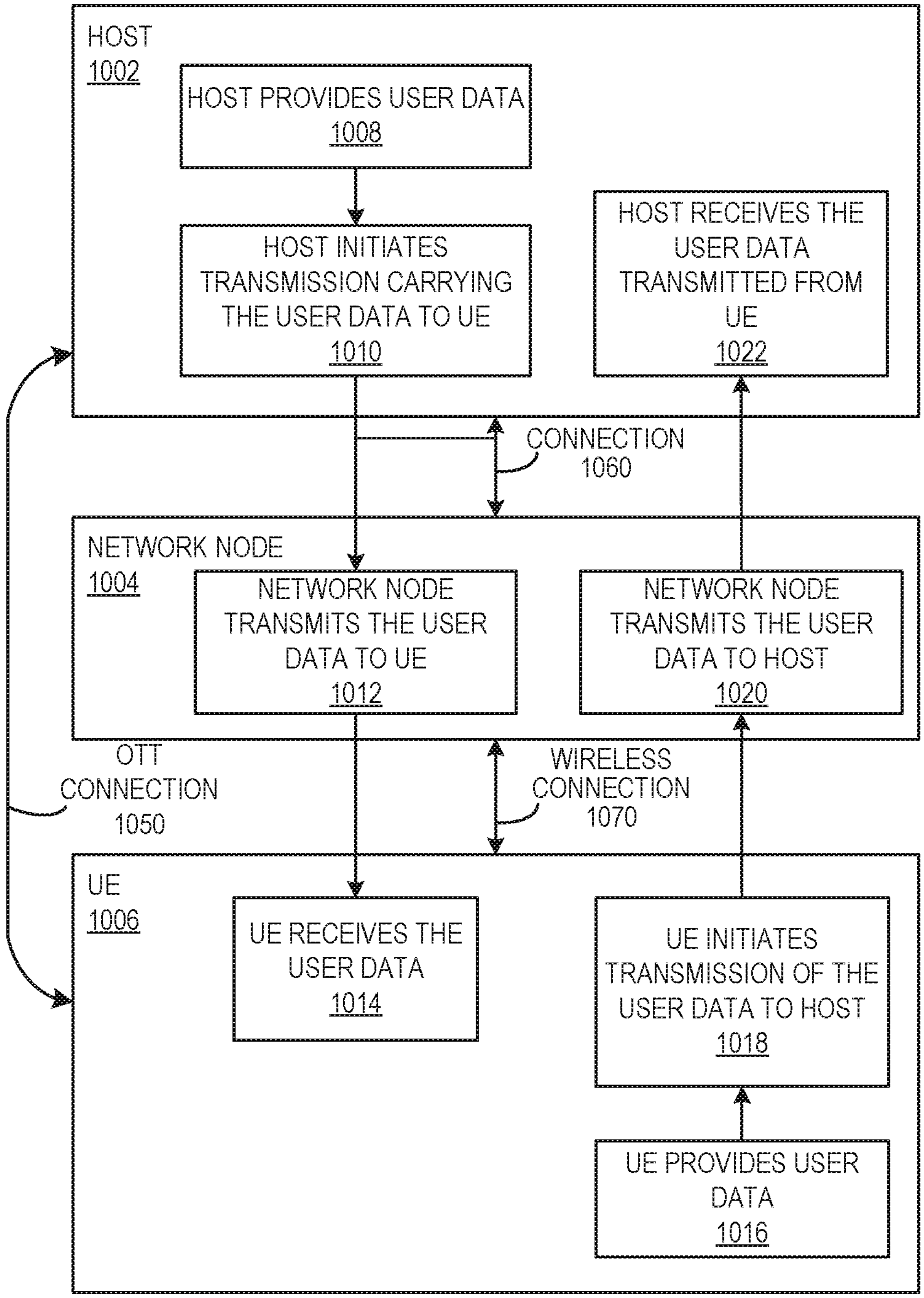
FIG. 10 shows a communication diagram of a host communicating via a network node with a UE over a partially wireless connection in accordance with some embodiments.

FIG. 10 shows a communication diagram of a host 1002 communicating via a network node 1004 with a UE 1006 over a partially wireless connection in accordance with some embodiments. Example implementations, in accordance with various embodiments, of the UE (such as the UE 412A of FIG. 4 and/or the UE 600 of FIG. 6), the network node (such as the network node 410A of FIG. 4 and/or the network node 700 of FIG. 7), and the host (such as the host 416 of FIG. 4 and/or the host 800 of FIG. 8) discussed in the preceding paragraphs will now be described with reference to FIG. 10.

Like the host 800, embodiments of the host 1002 include hardware, such as a communication interface, processing circuitry, and memory. The host 1002 also includes software, which is stored in or is accessible by the host 1002 and executable by the processing circuitry. The software includes a host application that may be operable to provide a service to a remote user, such as the UE 1006 connecting via an OTT connection 1050 extending between the UE 1006 and the host 1002. In providing the service to the remote user, a host application may provide user data which is transmitted using the OTT connection 1050.

The network node 1004 includes hardware enabling it to communicate with the host 1002 and the UE 1006 via a connection 1060. The connection 1060 may be direct or pass through a core network (like the core network 406 of FIG. 4) and/or one or more other intermediate networks, such as one or more public, private, or hosted networks. For example, an intermediate network may be a backbone network or the Internet.

The UE 1006 includes hardware and software, which is stored in or accessible by the UE 1006 and executable by the UE's processing circuitry. The software includes a client application, such as a web browser or operator-specific "app" that may be operable to provide a service to a human or non-human user via the UE 1006 with the support of the host 1002. In the host 1002, an executing host application may communicate with the executing client application via the OTT connection 1050 terminating at the UE 1006 and the host 1002. In providing the service to the user, the UE's client application may receive request data from the host's host application and provide user data in response to the request data. The OTT connection 1050 may transfer both the request data and the user data. The UE's client application may interact with the user to generate the user data that it provides to the host application through the OTT connection 1050.

The OTT connection 1050 may extend via the connection 1060 between the host 1002 and the network node 1004 and via a wireless connection 1070 between the network node 1004 and the UE 1006 to provide the connection between the host 1002 and the UE 1006. The connection 1060 and the wireless connection 1070, over which the OTT connection 1050 may be provided, have been drawn abstractly to illustrate the communication between the host 1002 and the UE 1006 via the network node 1004, without explicit reference to any intermediary devices and the precise routing of messages via these devices.

As an example of transmitting data via the OTT connection 1050, in step 1008, the host 1002 provides user data, which may be performed by executing a host application. In some embodiments, the user data is associated with a particular human user interacting with the UE 1006. In other embodiments, the user data is associated with a UE 1006 that shares data with the host 1002 without explicit human interaction. In step 1010, the host 1002 initiates a transmission carrying the user data towards the UE 1006. The host 1002 may initiate the transmission responsive to a request transmitted by the UE 1006. The request may be caused by human interaction with the UE 1006 or by operation of the client application executing on the UE 1006. The transmission may pass via the network node 1004 in accordance with the teachings of the embodiments described throughout this disclosure. Accordingly, in step 1012, the network node 1004 transmits to the UE 1006 the user data that was carried in the transmission that the host 1002 initiated, in accordance with the teachings of the embodiments described throughout this disclosure. In step 1014, the UE 1006 receives the user data carried in the transmission, which may be performed by a client application executed on the UE 1006 associated with the host application executed by the host 1002.

In some examples, the UE 1006 executes a client application which provides user data to the host 1002. The user data may be provided in reaction or response to the data received from the host 1002. Accordingly, in step 1016, the UE 1006 may provide user data, which may be performed by executing the client application. In providing the user data, the client application may further consider user input received from the user via an input/output interface of the UE 1006. Regardless of the specific manner in which the user data was provided, the UE 1006 initiates, in step 1018, transmission of the user data towards the host 1002 via the network node 1004. In step 1020, in accordance with the teachings of the embodiments described throughout this disclosure, the network node 1004 receives user data from the UE 1006 and initiates transmission of the received user data towards the host 1002. In step 1022, the host 1002 receives the user data carried in the transmission initiated by the UE 1006.

One or more of the various embodiments improve the performance of OTT services provided to the UE 1006 using the OTT connection 1050, in which the wireless connection 1070 forms the last segment. More precisely, the teachings of these embodiments may improve the e.g., data rate, latency, power consumption, etc. and thereby provide benefits such as e.g., reduced user waiting time, relaxed restriction on file size, improved content resolution, better responsiveness, extended battery lifetime, etc.

In an example scenario, factory status information may be collected and analyzed by the host 1002. As another example, the host 1002 may process audio and video data which may have been retrieved from a UE for use in creating maps. As another example, the host 1002 may collect and analyze real-time data to assist in controlling vehicle congestion (e.g., controlling traffic lights). As another example, the host 1002 may store surveillance video uploaded by a UE. As another example, the host 1002 may store or control access to media content such as video, audio, VR, or AR which it can broadcast, multicast, or unicast to UEs. As other examples, the host 1002 may be used for energy pricing, remote control of non-time critical electrical load to balance power generation needs, location services, presentation services (such as compiling diagrams etc. from data collected from remote devices), or any other function of collecting, retrieving, storing, analyzing, and/or transmitting data.

In some examples, a measurement procedure may be provided for the purpose of monitoring data rate, latency, and other factors on which the one or more embodiments improve. There may further be an optional network functionality for reconfiguring the OTT connection 1050 between the host 1002 and the UE 1006 in response to variations in the measurement results. The measurement procedure and/or the network functionality for reconfiguring the OTT connection 1050 may be implemented in software and hardware of the host 1002 and/or the UE 1006. In some embodiments, sensors (not shown) may be deployed in or in association with other devices through which the OTT connection 1050 passes; the sensors may participate in the measurement procedure by supplying values of the monitored quantities exemplified above, or by supplying values of other physical quantities from which software may compute or estimate the monitored quantities. The reconfiguring of the OTT connection 1050 may include message format, retransmission settings, preferred routing, etc.; the reconfiguring need not directly alter the operation of the network node 1004. Such procedures and functionalities may be known and practiced in the art. In certain embodiments, measurements may involve proprietary UE signaling that facilitates measurements of throughput, propagation times, latency, and the like by the host 1002. The measurements may be implemented in that software causes messages to be transmitted, in particular empty or 'dummy' messages, using the OTT connection 1050 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining, or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box or nested within multiple boxes, in practice computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hardwired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device but are enjoyed by the computing device as a whole and/or by end users and a wireless network generally.

EMBODIMENTS

Group A Embodiments

Embodiment 1: A method performed by a user equipment for determining a flow type, the method comprising one or more of: a. receiving (500) a configuration with an association between one or more of the group consisting of: DCIs; RNTIs; a combination of fields; and a flow identity; with one or more DRX configurations among a set of one or more DRX configurations; b. monitoring (502) a PDCCH in DRX Active Time; c. in response to receiving (504) a PDCCH with DRX DCI indication, identifying (506) the DRX configuration k associated to the DCI indication; and d. starting or restarting (508) a corresponding timer for the indicated DRX configuration in the next symbol after PDCCH reception.

Embodiment 2: The method of embodiment 1 wherein the flow identity comprises an LCID or an RB.

Embodiment 3: The method of any of embodiments 1-2 wherein the configuration is received via RRC.

Embodiment 4: The method of any of embodiments 1-3 further comprising: starting or restarting a corresponding timer for all DRX configurations for which its drx-onDurationTimer and/or drx-Inactivity Timer are running at that time.

Embodiment 5: The method of any of embodiments 1-4 wherein the corresponding timer associated to the indicated DRX configuration would apply to all selected corresponding timers.

Embodiment 6: The method of any of embodiments 1-5 further comprising: starting or restarting a corresponding timer for all DRX configurations for which its drx-onDurationTimer and/or drx-InactivityTimer are running at that time where all selected drx-InactivityTimer(s) would apply the value pointed by the index.

Embodiment 7: The method of any of embodiments 1-6 wherein the configuration comprises one or more of the group consisting of: an index indicating a DRX configuration; an index indicating a null/empty/default or special DRX configuration index; an index indicating a specific timer value from a plurality of timer (e.g., a drx-InactivityTimer) values.

Embodiment 8: The method of any of embodiments 1-7 wherein the corresponding timer comprises a drx-InactivityTimer(k).

Embodiment 9: The method of any of embodiments 1-8 wherein, if the PDCCH is scrambled with a new RNTI, prioritizing one predetermined drx-InactivityTimer value over all other multiple timers.

Embodiment 10: The method of any of embodiments 1-8 wherein, if the PDCCH is scrambled with a new RNTI, interpreting some or all of existing DCI or UCI fields for a new purpose to identify a flow index information.

Embodiment 11: The method of any of embodiments 1-10 wherein, when there is a special physical resource allocation indication for the implicit flow information, prioritizing one drx-InactivityTimer value over all other multiple timers or will extract a flow index information.

Embodiment 12: The method of any of the previous embodiments, further comprising: providing user data; and forwarding the user data to a host via the transmission to the network node.

Group B Embodiments

Embodiment 13: A method performed by a network node for indicating a flow type, the method comprising one or more of: a. configuring a user equipment with an association between one or more of the group consisting of: DCIs; RNTIs; a combination of fields; and a flow identity; with one or more DRX configurations among a set of one or more DRX configurations; b. transmitting a PDCCH with DRX DCI indication identifying the DRX configuration k associated to the DCI indication; and c. determining that a corresponding timer for the indicated DRX configuration is started or restarted in the next symbol after PDCCH.

Embodiment 14: The method of embodiment 13 wherein the flow identity comprises an LCID or an RB.

Embodiment 15: The method of any of embodiments 13-14 wherein the configuration is transmitted via RRC.

Embodiment 16: The method of any of embodiments 13-15 wherein the configuration comprises one or more of the group consisting of: an index indicating a DRX configuration; an index indicating a null/empty/default or special DRX configuration index; an index indicating a specific timer value from a plurality of timer (e.g., a drx-InactivityTimer) values.

Embodiment 17: The method of any of embodiments 13-16 wherein the corresponding timer comprises a drx-InactivityTimer(k).

Embodiment 18: The method of any of embodiments 13-17 wherein, if the PDCCH is scrambled with a new RNTI, the user equipment prioritizes one predetermined drx-Inactivity Timer value over all other multiple timers.

Embodiment 19: The method of any of embodiments 13-17 wherein, if the PDCCH is scrambled with a new RNTI, the user equipment interprets some or all of existing DCI or UCI fields for a new purpose to identify a flow index information.

Embodiment 20: The method of any of embodiments 1-10 wherein, when there is a special physical resource allocation indication for the implicit flow information, the user equipment prioritizes one drx-InactivityTimer value over all other multiple timers or will extract a flow index information.

Embodiment 21: The method of any of the previous embodiments, further comprising: obtaining user data; and forwarding the user data to a host or a user equipment.

Group C Embodiments

Embodiment 22: A user equipment for determining a flow type, comprising: processing circuitry configured to perform any of the steps of any of the Group A embodiments; and power supply circuitry configured to supply power to the processing circuitry.

Embodiment 23: A network node for determining a flow type, the network node comprising: processing circuitry configured to perform any of the steps of any of the Group B embodiments; power supply circuitry configured to supply power to the processing circuitry.

Embodiment 24: A user equipment (UE) for determining a flow type, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 25: A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to receive the user data from the host.

Embodiment 26: The host of the previous embodiment, wherein the cellular network further includes a network node configured to communicate with the UE to transmit the user data to the UE from the host.

Embodiment 27: The host of the previous 2 embodiments, wherein: the processing circuitry of the host is configured to execute a host application, thereby providing the user data; and the host application is configured to interact with a client application executing on the UE, the client application being associated with the host application.

Embodiment 28: A method implemented by a host operating in a communication system that further includes a network node and a user equipment (UE), the method comprising: providing user data for the UE; and initiating a transmission carrying the user data to the UE via a cellular network comprising the network node, wherein the UE performs any of the operations of any of the Group A embodiments to receive the user data from the host.

Embodiment 29: The method of the previous embodiment, further comprising: at the host, executing a host application associated with a client application executing on the UE to receive the user data from the UE.

Embodiment 30: The method of the previous embodiment, further comprising: at the host, transmitting input data to the client application executing on the UE, the input data being provided by executing the host application, wherein the user data is provided by the client application in response to the input data from the host application.

Embodiment 31: A host configured to operate in a communication system to provide an over-the-top (OTT) service, the host comprising: processing circuitry configured to provide user data; and a network interface configured to initiate transmission of the user data to a cellular network for transmission to a user equipment (UE), wherein the UE comprises a communication interface and processing circuitry, the communication interface and processing circuitry of the UE being configured to perform any of the steps of any of the Group A embodiments to transmit the user data to the host.

Embodiment 32: The host of the previous embodiment, wherein the cellular network further includes a network node configured to communicate with the UE to transmit the user data from the UE to the host.

Embodiment 33: The host of the previous 2 embodiments, wherein: the processing circuitry of the host is configured to execute a host application, thereby providing the user data; and the host application is configured to interact with a client application executing on the UE, the client application being associated with the host application.

Embodiment 34: A method implemented by a host configured to operate in a communication system that further includes a network node and a user equipment (UE), the method comprising: at the host, receiving user data transmitted to the host via the network node by the UE, wherein the UE performs any of the steps of any of the Group A embodiments to transmit the user data to the host.

Embodiment 35: The method of the previous embodiment, further comprising: at the host, executing a host application associated with a client application executing on the UE to receive the user data from the UE.

Embodiment 36: The method of the previous embodiment, further comprising: at the host, transmitting input data to the client application executing on the UE, the input data being provided by executing the host application, wherein the user data is provided by the client application in response to the input data from the host application.

Embodiment 37: A host configured to operate in a communication system to provide an over-the-top (OTT) service, the host comprising: processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.

Embodiment 38: The host of the previous embodiment, wherein: the processing circuitry of the host is configured to execute a host application that provides the user data; and the UE comprises processing circuitry configured to execute a client application associated with the host application to receive the transmission of user data from the host.

Embodiment 39: A method implemented in a host configured to operate in a communication system that further includes a network node and a user equipment (UE), the method comprising: providing user data for the UE; and initiating a transmission carrying the user data to the UE via a cellular network comprising the network node, wherein the network node performs any of the operations of any of the Group B embodiments to transmit the user data from the host to the UE.

Embodiment 40: The method of the previous embodiment, further comprising, at the network node, transmitting the user data provided by the host for the UE.

Embodiment 41: The method of any of the previous 2 embodiments, wherein the user data is provided at the host by executing a host application that interacts with a client application executing on the UE, the client application being associated with the host application.

Embodiment 42: A communication system configured to provide an over-the-top service, the communication system comprising: a host comprising: processing circuitry configured to provide user data for a user equipment (UE), the user data being associated with the over-the-top service; and a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.

Embodiment 43: The communication system of the previous embodiment, further comprising: the network node; and/or the user equipment.

Embodiment 44: A host configured to operate in a communication system to provide an over-the-top (OTT) service, the host comprising: processing circuitry configured to initiate receipt of user data; and a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.

Embodiment 45: The host of the previous 2 embodiments, wherein: the processing circuitry of the host is configured to execute a host application, thereby providing the user data; and the host application is configured to interact with a client application executing on the UE, the client application being associated with the host application.

Embodiment 46: The host of the any of the previous 2 embodiments, wherein the initiating receipt of the user data comprises requesting the user data.

Embodiment 47: A method implemented by a host configured to operate in a communication system that further includes a network node and a user equipment (UE), the method comprising: at the host, initiating receipt of user data from the UE, the user data originating from a transmission which the network node has received from the UE, wherein the network node performs any of the steps of any of the Group B embodiments to receive the user data from the UE for the host.

Embodiment 48: The method of the previous embodiment, further comprising at the network node, transmitting the received user data to the host.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
CRC Cyclic Redundancy Check
DCI Downlink Control Information
DCP DCI with CRC scrambled by PS-RNTI
DL Downlink
DN Data Network
DRX Discontinuous Reception
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LCID Logical Channel ID
LTE Long Term Evolution
MAC Medium Access Control
MME Mobility Management Entity
MTC Machine Type Communication
NEF Network Exposure Function
NF Network Function
NR New Radio
NRF Network Function Repository Function
NSSF Network Slice Selection Function
NW Network
OFDM Orthogonal Frequency Division Multiplexing
OTT Over-the-Top
PC Personal Computer
PCF Policy Control Function
PDCCH Physical Downlink Control Channel
PDU Packet Data Unit.
P-GW Packet Data Network Gateway
PS-RNTI Power Saving Radio Network Temporary Identifier
PUCCH Physical Uplink Control Channel
QoS Quality of Service
RAM Random Access Memory
RAN Radio Access Network
RB Radio Bearer
RNTI Radio Network Temporary Identifier
ROM Read Only Memory
RRC Radio Resource Control
RRH Remote Radio Head
RTT Round Trip Time
SCEF Service Capability Exposure Function
SMF Session Management Function
UCI Uplink Control Information
UDM Unified Data Management
UE User Equipment
UL Uplink
UPF User Plane Function
XR Extended Reality Those skilled in the art will recognize improvements and modifications to the embodiments of the present disclosure. All such improvements and modifications are considered within the scope of the concepts disclosed herein.

The invention claimed is:

1. A method performed by a User Equipment, UE, for determining a flow type, the method comprising:

receiving a configuration of flow identity information with an association between one or more of the group consisting of: Downlink Control Information, DCIs; Radio Network Temporary Identifier, RNTIs; a combination of fields; with one or more Discontinuous Reception, DRX, configurations among a set of one or more DRX configurations;

monitoring a Physical Downlink Control Channel, PDCCH, in DRX Active Time;

in response to receiving a PDCCH with DCI indication of a flow type, identifying the DRX configuration k associated to the DCI indication; and starting or restarting a corresponding timer for the identified DRX configuration in a next symbol after the PDCCH reception.

2. The method of claim 1 wherein the flow identity information comprises a Logical Channel ID, LCID, and/or a Radio Bearer, RB, and wherein the configuration is received via Radio Resource Control, RRC.

3. The method of claim 1 further comprising: starting or restarting the corresponding timer for all DRX configurations for which their drx-onDurationTimers and/or drx-InactivityTimers are running at that time.

4. The method of claim 1 wherein the corresponding timer associated to the indicated DRX configuration would apply to all selected corresponding timers.

5. The method of claim 1 further comprising: starting or restarting the corresponding timer for all DRX configurations for which their drx-onDurationTimer and/or drx-InactivityTimer are running at that time where all selected drx-onDurationTimer and/or drx-InactivityTimer(s) would apply a value pointed by an index.

6. The method of claim 1 wherein the configuration comprises one or more of the group consisting of: an index indicating a DRX configuration; an index indicating a null/empty/default or special DRX configuration index; an index indicating a specific timer value from a plurality of timer values.

7. The method of claim 6 wherein the plurality of timer values comprises a plurality of drx-InactivityTimer values.

8. The method of claim 1 wherein the corresponding timer comprises a drx-InactivityTimer (k).

9. The method of claim 1 wherein, if the PDCCH is scrambled with a new RNTI, prioritizing one predetermined drx-InactivityTimer value over all other multiple timers.

10. The method of claim 1 wherein, if the PDCCH is scrambled with a new RNTI, interpreting some or all of existing DCI or Uplink Control Information, UCI, fields for a new purpose to identify a flow index information.

11. The method of claim 1 wherein, when there is a special physical resource allocation indication for implicit flow information, prioritizing one drx-InactivityTimer value over all other multiple timers or will extract a flow index information.

12. A method performed by a network node for indicating a flow type, the method comprising:

configuring a User Equipment, UE, with an association between one or more of the group consisting of: Downlink Control Information, DCIs; Radio Network Temporary Identifier, RNTIs; a combination of fields; and a flow identity; with one or more Discontinuous Reception, DRX, configurations among a set of one or more DRX configurations;

transmitting a Physical Downlink Control Channel, PDCCH, with DCI indication identifying the corresponding DRX configuration k; and determining that a corresponding timer for the identified DRX configuration is started or restarted in a next symbol after the PDCCH.

13. The method of claim 12 wherein the flow identity comprises a Logical Channel ID, LCID, and/or a Radio Bearer, RB, and wherein the configuration is transmitted via Radio Resource Control, RRC.

14. The method of claim 12 wherein the configuration comprises one or more of the group consisting of: an index indicating a DRX configuration; an index indicating a null/empty/default or special DRX configuration index; an index indicating a specific timer value from a plurality of timer values.

15. The method of claim 12 wherein the corresponding timer comprises a drx-InactivityTimer (k).

16. The method of claim 12 wherein, if the PDCCH is scrambled with a new RNTI, the UE prioritizes one predetermined drx-InactivityTimer value over all other multiple timers.

17. The method of claim 12 wherein, if the PDCCH is scrambled with a new RNTI, the UE interprets some or all of existing DCI or Uplink Control Information, UCI, fields for a new purpose to identify a flow index information.

18. The method of claim 12 wherein, when there is a special physical resource allocation indication for implicit flow information, the UE prioritizes one drx-InactivityTimer value over all other multiple timers or will extract the flow index information.

19. A User Equipment, UE, comprising:

processing circuitry and memory wherein the memory comprises instructions configured to cause the UE to:

receive a configuration of flow identity information with an association between one or more of the group consisting of: Downlink Control Information, DCIs; Radio Network Temporary Identifier, RNTIs; a combination of fields; with one or more Discontinuous Reception, DRX, configurations among a set of one or more DRX configurations;

monitor a Physical Downlink Control Channel, PDCCH, in DRX Active Time;

in response to receiving a PDCCH with DCI indication of a flow type, identify the DRX configuration k associated to the DCI indication; and start or restart a corresponding timer for the identified DRX configuration in a next symbol after the PDCCH reception.

* * * * *